(12) United States Patent
Younis et al.

(10) Patent No.: US 12,074,633 B2
(45) Date of Patent: Aug. 27, 2024

(54) SYSTEM AND METHOD FOR INDOOR LOCATION

(71) Applicant: Lonprox Corporation, San Diego, CA (US)

(72) Inventors: Saed Younis, San Diego, CA (US); Wesley J. Chaffin, San Diego, CA (US); Nathaniel Danandeh, San Diego, CA (US)

(73) Assignee: LONPROX CORPORATION, San Diego, CA (US)

( * ) Notice: Subject to any disclaimer, the term of this patent is extended or adjusted under 35 U.S.C. 154(b) by 1041 days.

(21) Appl. No.: 16/939,969

(22) Filed: Jul. 27, 2020

(65) Prior Publication Data

US 2021/0033737 A1 Feb. 4, 2021

Related U.S. Application Data

(60) Provisional application No. 62/879,884, filed on Jul. 29, 2019.

(51) Int. Cl.
*H04B 1/7073* (2011.01)
*G01S 19/39* (2010.01)
*G01S 19/40* (2010.01)

(52) U.S. Cl.
CPC .......... *H04B 1/7073* (2013.01); *G01S 19/396* (2019.08); *G01S 19/40* (2013.01)

(58) Field of Classification Search
CPC ..... H04B 1/7073; G01S 19/396; G01S 19/40; G01S 5/0027; G01S 5/0242; G01S 2205/02; G01S 1/024; G01S 1/0426; G01S 1/0428; G01S 5/10; G01S 5/021; H04J 13/0022

See application file for complete search history.

(56) References Cited

U.S. PATENT DOCUMENTS 9,813,877 B1 * 11/2017 Chrabieh ............ H04W 56/001
10,151,844 B1 12/2018 Pahlavan et al.
2015/0092754 A1 4/2015 Gupta
(Continued)

FOREIGN PATENT DOCUMENTS

JP 2017-015562 A 1/2017

OTHER PUBLICATIONS

International Search Report and Written Opinion for corresponding International Application No. PCT/US2020/043725, mailed on Nov. 10, 2020, in 11 pages.
(Continued)

*Primary Examiner* — Seung C Sohn
(74) *Attorney, Agent, or Firm* — Procopio, Cory, Hargreaves & Savitch LLP

(57) ABSTRACT

Systems and methods enabling location determination within an indoor environment. In an embodiment, a plurality of stationary nodes are arranged as a constellation within the indoor environment. Each of the plurality of stationary nodes may be configured to transmit a ranging signal, receive ranging signals transmitted by one or more neighboring ones of the plurality of stationary nodes, calculate an offset between the ranging signal that the stationary node transmits and the ranging signals received from the one or more neighboring stationary nodes, and include the offset in the ranging signal that the stationary node transmits.

36 Claims, 3 Drawing Sheets

(56) References Cited

U.S. PATENT DOCUMENTS

| | | | |
|---|---|---|---|
| 2015/0271643 A1* | 9/2015 | Jalali | G06K 7/10009 |
| | | | 455/456.1 |
| 2015/0341881 A1 | 11/2015 | Hiltunen et al. | |
| 2016/0261306 A1 | 9/2016 | Seller et al. | |
| 2018/0136307 A1* | 5/2018 | Turner | G01S 5/0294 |
| 2018/0310272 A1 | 10/2018 | Younis | |

OTHER PUBLICATIONS

Extended European Search Report received in EP Application No. 20845957.8, mailed Oct. 10, 2023, 8 pages.

* cited by examiner

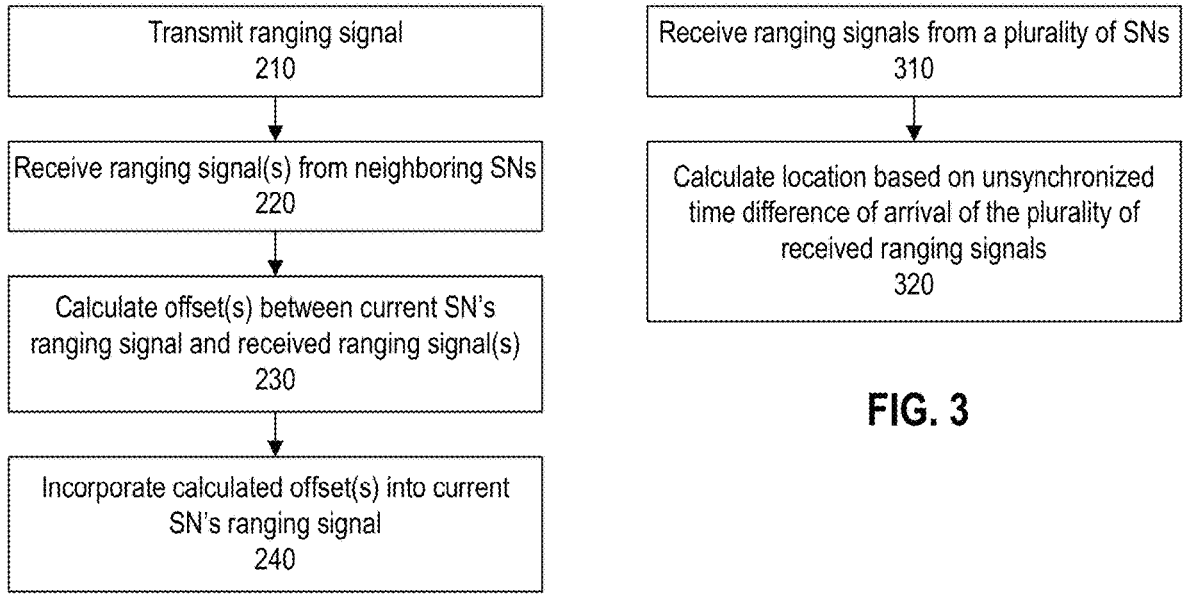
FIG. 2
FIG. 3
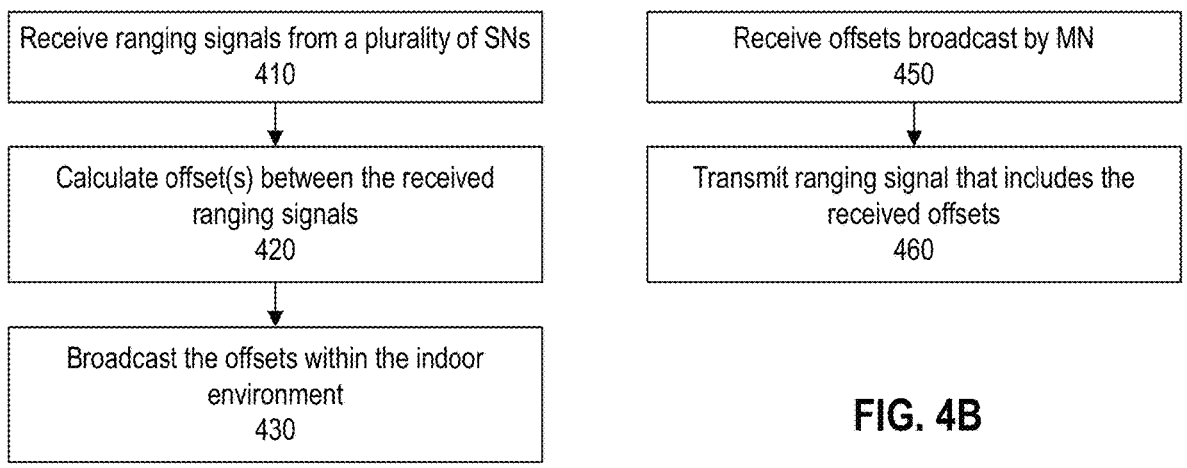
FIG. 4A
FIG. 4B

SYSTEM AND METHOD FOR INDOOR LOCATION

CROSS-REFERENCE TO RELATED APPLICATIONS

This application claims priority to U.S. Provisional Patent App. No. 62/879,884, filed on Jul. 29, 2019, which is hereby incorporated herein by reference as if set forth in full.

BACKGROUND

Technical Field

This disclosure relates to systems and methods for providing indoor location services. More specifically, this disclosure relates to a system having a constellation of unsynchronized wireless positioning nodes in an indoor environment, that allow a roaming node to independently calculate position within the indoor environment.

INTRODUCTION

Indoor position location has become increasingly important in today's mobile wireless environment. Applications for indoor position location can include retail, advertising, commercial, and residential environments. Currently, among the many available possible indoor position solutions, a solution based on using low power beacons that employs the Bluetooth™ standard has emerged as a popular solution to provide indoor proximity estimates to mobile devices. A mobile device detecting the transmission of a specific beacon can determine that it is within close proximity of that beacon's position by relying on estimates of transmitted and received signal strength. However, such beacon technology only provides proximity information, and is unable to determine a three-dimensional (e.g., x, y, z) location within an indoor space.

Some beacon-based (e.g., Bluetooth) solutions may rely on estimates of Received Signal Strength Indicators (RSSI) to estimate distance between the mobile device and the beacon. The signal transmitted by the beacon is of known power, and the received signal strength at the mobile receiver is measured. Employing a model of path loss, the system attempts to estimate the distance between the mobile device and the beacon. However, RSSI of RF signals can significantly vary depending on changing environmental conditions, especially as the distance between the mobile device and the beacon increases. Increased accuracy can require numerous low-power beacons, complicating the installation within a given room or other space. On the other hand, output power of the beacon can be increased to increase its range, but this leads to lower accuracy and shorter battery life in the beacon. In addition, increased power levels can lead to room or floor ambiguity (e.g., by enabling the signal to travel through walls and/or floors), adversely affecting the utility of the installed beacon(s). Furthermore, even if distance is accurately determined, a single beacon provides no directional information for the detecting mobile, and therefore, no physical location.

For some applications, knowledge of the precise position, rather than just proximity, is crucial. For example, there are applications where robots or drones are roaming inside a building. Advantageously, if a beacon according to the present disclosure is placed in an indoor space and each robot or drone contains the circuitry to determine its accurate position according to the present disclosure, navigation within the indoor space can be improved.

SUMMARY

Accordingly, systems and methods are disclosed for enabling location determination with an indoor environment.

In an embodiment, a system comprises: a plurality of stationary nodes to be arranged as a constellation within the indoor environment, wherein each of the plurality of stationary nodes is configured to transmit a ranging signal, receive ranging signals transmitted by one or more neighboring ones of the plurality of stationary nodes, calculate an offset between the ranging signal that the stationary node transmits and the ranging signals received from the one or more neighboring stationary nodes, and include the offset in the ranging signal that the stationary node transmits.

In a embodiment, a method comprises, by each of a plurality of stationary nodes arranged in a constellation within an indoor environment: transmitting a ranging signal; receiving ranging signals transmitted by one or more neighboring ones of the plurality of stationary nodes; calculating an offset between the ranging signal that the stationary node transmits and the ranging signals received from the one or more neighboring stationary nodes; and including the offset in the ranging signal that the stationary node transmits.

In an embodiment, a system comprises: a measuring node arranged within a constellation of a plurality of stationary nodes within an indoor environment, wherein the measuring node is configured to receive ranging signals transmitted by the plurality of stationary nodes, calculate time offsets between the received ranging signals for all of the plurality of stationary nodes, and broadcast the time offsets within the indoor environment; and the plurality of stationary nodes, wherein each of the plurality of stationary nodes is configured to receive the time offsets broadcast by the measuring node, and transmit a ranging signal that includes the received time offsets.

In an embodiment, a method comprises: by a measuring node arranged within a constellation of a plurality of stationary nodes within an indoor environment, receiving ranging signals transmitted by the plurality of stationary nodes, calculating time offsets between the received ranging signals for all of the plurality of stationary nodes, and broadcasting the time offsets within the indoor environment; and, by each of the plurality of stationary nodes, receiving the time offsets broadcast by the measuring node, and transmitting a ranging signal that includes the received time offsets.

Any of the embodiments may comprise one or more of the following features: none of the plurality of stationary nodes synchronize with each other; none of the plurality of stationary nodes communicate with any central server or other master node; and/or each of the plurality of stationary nodes transmits the ranging signal using direct-sequence spread spectrum (DSSS). The DSSS may use maximal code decimation. The ranging signal transmitted by each of the plurality of stationary nodes may be spread one gigahertz wide.

In any of the embodiments, all of the ranging signals may be transmitted by the plurality of stationary nodes using a same Linear Feedback Shift Register (LFSR) polynomial code, wherein each of the plurality of stationary nodes uses a different pseudorandom number (PN) offset than all others of the plurality of stationary nodes, such that the ranging signal transmitted by each of the plurality of stationary nodes is distinguishable from the ranging signal transmitted by all others of the plurality of stationary nodes based on the respective PN offset. Each of the plurality of stationary nodes may be configured to: monitor the PN offsets of the others of the plurality of stationary nodes; and, when the PN offset of the stationary node is within a threshold distance to a monitored PN offset, determine whether or not the stationary node should perform a PN jump based on at least one predefined criterion, and, when determining that the stationary node should perform the PN jump, randomly select a new PN offset that does not conflict with any of the monitored PN offsets.

Any of the embodiments may comprise one or more of the following features: the ranging signal transmitted by at least one of the plurality of stationary nodes uses a different polynomial code than the ranging signal transmitted by one or more others of the plurality of stationary nodes; and/or the offset is included in the ranging signal as one or more coefficients to a predictive modeling equation.

Any of the embodiments may comprise a roaming node, wherein the roaming node comprises at least one processor configured to: receive the ranging signals transmitted by at least three of the plurality of stationary nodes; and calculate a three-dimensional position of the roaming node within the indoor environment based on an unsynchronized time difference of arrival of the ranging signals and the offset included in each of the received ranging signals. The roaming node may comprise one or more inertial measurement units, wherein an output of the one or more inertial measurement units is used during calculation of the three-dimensional position of the roaming node. In an implementation, the roaming node never uses a reverse link from the roaming node to any of the plurality of stationary nodes to receive the ranging signals and calculate its three-dimensional position. The at least one processor of the roaming node may be further configured to transmit the three-dimensional position to a remote server over at least one network. The remote server may be configured to: from each of a plurality of roaming nodes, receive the three-dimensional position, calculated by the roaming node, over the at least one network; and provide at least one software-based service based on the received three-dimensional position of one or more of the plurality of roaming nodes.

In any of the embodiments, each of the plurality of stationary nodes may be configured to operate in both a first mode in which only a forward link is used from the stationary node to each of one or more roaming nodes, and a second mode in which both the forward link is used and a reverse link is used from each of the one or more roaming nodes to the stationary node. Each of the plurality of stationary nodes may be configured to: monitor for a signal on the reverse link with a pseudorandom number (PN) offset within a threshold distance from a PN offset used by the stationary node; and, when the signal is detected on the reverse link, broadcast a time and carrier offset between the detected signal and a pilot signal of the stationary node.

Any of the embodiments may comprise one or more of the following features: a transmission power of each ranging signal is set such that the ranging signal is below thermal background noise at room temperature at a distance of one meter from the stationary node that transmitted the ranging signal; a calibration node that comprises at least one processor configured to, after the plurality of stationary nodes have been arranged in the constellation and while the calibration node is moved in a pattern with a known relationship to a datum of the indoor environment, and/or calculate a location of each of the plurality of stationary nodes with respect to the datum.

In any of the embodiments, the ranging signal may comprise a pilot channel, a binary offset carrier (BOC) channel, a data channel, and an acquisition channel. The data channel may use block interleaving and forward error correction (FEC) code. The pilot channel, the BOC channel, and the data channel may use a long code, and the acquisition channel may use a short code that is shorter than the long code. A roaming node may comprise at least one processor configured to: for at least one of the plurality of stationary nodes, acquire the ranging signal transmitted by the at least one stationary node by acquiring the acquisition channel in the ranging signal by searching for the short code of the stationary node, using the acquired acquisition channel to acquire a timing of the pilot channel in the ranging signal, and using the timing of the pilot channel to acquire a timing of the BOC channel and the data channel in the ranging signal; and, after the ranging signals have been acquired from three or more stationary nodes, comprising the at least one stationary node, calculate a three-dimensional position of the roaming node within the indoor environment based on an unsynchronized time difference of arrival of the acquired ranging signals and the offset included in each of the acquired ranging signals. The data channel in the ranging signal transmitted by the at least one stationary node may comprise aiding information comprising one or more parameters for a neighboring set of the plurality of stationary nodes that are neighbors of the at least one stationary node, wherein the at least one processor of the roaming node is further configured to use the aiding information to acquire the ranging signals for the neighboring set of stationary nodes, and wherein the three or more stationary nodes comprise the neighboring set of stationary nodes. A roaming node may comprise at least one processor configured to: for at least one of the plurality of stationary nodes, acquire the acquisition channel in the ranging signal transmitted by the at least one stationary node by searching for the short code of the stationary node; use the acquired acquisition channel to retrieve aiding information from a remote server over at least one network, wherein the aiding information comprises one or more parameters for the at least one stationary node and a neighboring set of the plurality of stationary nodes that are neighbors of the at least one stationary node; use the aiding information to acquire the ranging signals for the at least one stationary node and the neighboring set of stationary nodes; and after acquiring the ranging signals for the at least one stationary node and the neighboring set of stationary nodes, calculate a three-dimensional position of the roaming node within the indoor environment based on an unsynchronized time difference of arrival of the acquired ranging signals and the offset included in each of the acquired ranging signals.

In any of the embodiments, at least one of the plurality of stationary nodes may be configured to transmit a packet comprising one or more parameters for the at least one stationary node and a neighboring set of the plurality of stationary nodes that are neighbors of the at least one stationary node, wherein the packet is either a Bluetooth™ packet or a Wi-Fi™ packet, wherein the system further comprises a roaming node, and wherein the roaming node comprises at least one processor configured to: detect the packet transmitted by the at least one stationary node; use the one or more parameters in the packet to acquire the ranging signals for the at least one stationary node and the neighboring set of stationary nodes; and after acquiring the ranging signals for the at least one stationary node and the neighboring set of stationary nodes, calculate a three-dimensional position of the roaming node within the indoor environment based on an unsynchronized time difference of arrival of the acquired ranging signals and the offset included in each of the acquired ranging signals.

In any of the embodiments, at least one of the plurality of stationary nodes may be configured to transmit a packet comprising an identifier of the stationary node, wherein the packet is either a Bluetooth™ packet or a Wi-Fi™ packet, wherein the system further comprises a roaming node, and wherein the roaming node comprises at least one processor configured to: detect the packet transmitted by the at least one stationary node; use the identifier in the packet to retrieve aiding information from a remote server over at least one network, wherein the aiding information comprises one or more parameters for the at least one stationary node and a neighboring set of the plurality of stationary nodes that are neighbors of the at least one stationary node; use the aiding information to acquire the ranging signals for the at least one stationary node and the neighboring set of stationary nodes; and after acquiring the ranging signals for the at least one stationary node and the neighboring set of stationary nodes, calculate a three-dimensional position of the roaming node within the indoor environment based on an unsynchronized time difference of arrival of the acquired ranging signals and the offset included in each of the acquired ranging signals.

In any of the embodiments, each ranging signal may comprise a packet that comprises the offset, wherein each packet is either a Bluetooth™ or Wi-Fi™ packet, and wherein each of the plurality of stationary nodes is configured to transmit the packet at least ten times per second. Each of the plurality of stationary nodes may be configured to, for each of a plurality of time periods: generate a random number; broadcast the random number; receive the random numbers broadcast by others of the plurality of stationary nodes; and transmit the packet according to an order of the generated random number within the received random numbers. A roaming node may comprise at least one processor configured to: receive the packets transmitted by at least five of the plurality of stationary nodes; and calculate a three-dimensional position of the roaming node within the indoor environment based on an unsynchronized time difference of arrival of the packets and the offset included in each of the received packets.

In any of the embodiments, each of the plurality of stationary nodes may be further configured to transmit both a primary ranging signal and a secondary ranging signal, and wherein the secondary ranging signal has a different center carrier frequency than the primary ranging signal.

In any of the embodiments, a server may be configured to: from each of one or more roaming nodes within the indoor environment, receive an indication of a power level of one or more ranging signals, transmitted by a subset of the plurality of stationary nodes, as received by the roaming node; and apply an optimization algorithm to the received indications of power levels to determine one or more adjustments to a transmission power of the ranging signal transmitted by one or more of the plurality of stationary nodes; and send a control instruction to the one or more stationary nodes to adjust the transmission power of the one or more stationary nodes according to the determined one or more adjustments.

Any of the embodiments may comprise one or more of the following features: each of the plurality of stationary nodes is configured to cycle transmission of the ranging signal between on and off; the offset comprises a time offset and a frequency offset; and/or each of one or more of the plurality of stationary nodes is housed within a containing device that provides a function other than location determination.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 2-4B illustrate example processes that may be performed by various nodes in the system, according to embodiments.

DETAILED DESCRIPTION

System Architecture

The detailed description set forth below, in connection with the accompanying drawings, is intended as a disclosure of various embodiments and is not intended to represent the only embodiments in which the disclosure may be practiced. The detailed description includes specific details for the purpose of providing a thorough understanding of the embodiments. However, it will be apparent to those skilled in the art that the disclosure can be practiced without these specific details. In some instances, well-known structures and components are shown in simplified form for brevity of description. Some structures and components disclosed in U.S. Pat. No. 10,015,769, issued Jul. 3, 2018, entitled, SYSTEMS AND METHODS FOR INDOOR POSITIONING USING WIRELESS POSITIONING NODES, may be used in embodiments described herein. U.S. Pat. No. 10,015,769 is hereby incorporated herein by reference as if set forth in full.

Figure 1:
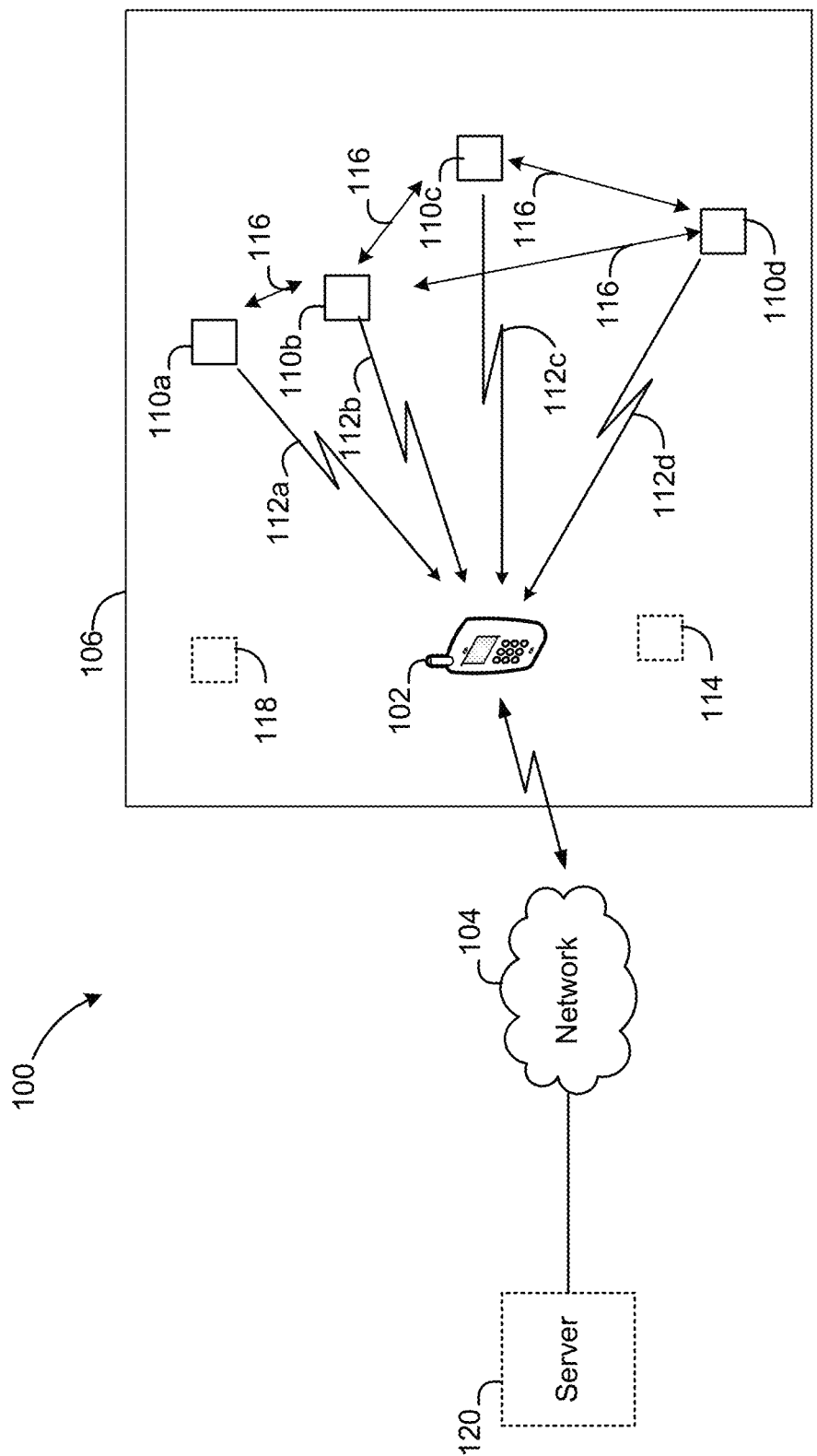
FIG. 1 illustrates an example system in which location determination is performed, according to an embodiment.

FIG. 1 is a graphical depiction of an embodiment of an indoor positioning system for a mobile device. An indoor positioning system (system) 100 can have a roaming node (RN) 102. The RN 102 can be a smart phone or other mobile electronic device including software and/or hardware as disclosed herein. The RN 102 can be communicatively coupled to a server 120 via a wide area network (WAN) or network 104. The network 104 can include, for example, the Internet and/or other applicable wireless network. The system 100 can be associated with an indoor environment 106. The system 100 can have one or more stationary nodes (SNs) 110 located within the indoor environment 106 with the RN 102. The SNs 110 may also be referred to herein simply as beacons or nodes. The SNs 110 are labeled as SN 110a, SN 110b, SN 110c, and SN 110d, but may referred to collectively as SNs 110. The grouping of the SNs 110a, 110b, 110c, 110d can be referred to as a constellation of SNs 110. Each SN 110 can transmit one or more signals 112 (shown as a signal 112a, a signal 112b, a signal 112c, a signal 112D) that the RN 102 can use to determine a three-dimensional position within the indoor environment 106. The signals 112 are continuously or periodically transmitted, as required. For ease of description, the SNs 110 are depicted as each transmitting a single signal 112. However as described herein, each of the SNs 110 may have one or more antennas, and each antenna can transmit a respective version of the signal 112. Thus, each SN 110 can actually transmit one or more signals 112 as needed according to the following embodiments.

As the RN 102 moves indoors, it may not have sufficient signal to provide precise positioning via, for example, a global positioning system (GPS) signal. The RN 102 may initially determine an approximate or general physical position of the indoor environment 106 based on a coarse location via a last known outdoor location, for example, via GPS location of the RN 102. In some other examples, the RN 102 can determine a coarse location based on Wi-Fi signals from one or more networks in the local area or even within the indoor environment 106. In addition, while a Wi-Fi signal may provide general location (e.g., somewhere inside a given building), such location information is still "coarse" in terms of the indoor positioning system disclosed herein. In some embodiments, the signals 112 transmitted by the SNs 110 can also include an indication of an approximate position of the indoor environment 106. In some embodiments, the coarse position may be the size of the local vicinity spanning one or more rooms within an identified building, and is used by the server 120 to provide the appropriate aiding information.

The SNs 110 may continuously or periodically transmit and receive multi-tiered ranging signals. The RN 102 can receive the various signals from the SNs 110 within the indoor environment 106, to determine its own three-dimensional position within the indoor environment, as described herein. Optionally, the RN 102 can then report the computed position back to the server 120. In ranging systems in which high accuracy is required, complex circuitry, with higher power consumption, may be utilized for higher positioning resolution. Conversely, for applications which do not require high accuracy, less complex circuitry, with lower power consumption, may be utilized for lower positioning resolution.

In certain embodiments, the SN 110 can be a single, stand-alone positioning device having one or multiple antennas (e.g., four or more antennas). Alternatively, the SNs 110 can be co-located with or within various smart devices, Internet of things (IOT) devices, and other common household appliances or other systems. For example, the SNs 110 may be housed within smoke detectors, alarm modules, light bulbs, ballasts, and other IoT or smart appliances or fixtures. Such devices that house an SN 110, but provide additional functionality, may be referred to herein as containing devices (CDs). In other words, CDs are generally any device that can contain the SNs 110. A CD, such as a smoke detector or lightbulb, may have confined or limited space constraints. Accordingly, the SN 110 in such a device may only accommodate a single or a limited number of antennas. It should be understood that the system 100 may comprise CDs only, stand-alone SNs, or a combination of CD(s) and stand-alone SN(s).

An advantage of co-locating SNs 110 within CDs is the existing presence of CDs in most indoor locations. Thus, such co-location allows a one-for-one replacement between CDs and existing devices. In addition, these existing devices may already have a constant continuous power source that can be used by the CDs, including the SNs 110 therein, that replace them. The SNs 110 co-located in CDs can take advantage of preexisting wiring and/or other electrical/electronic backbone within the indoor environment 106. The pre-existing backbone can provide a constant continuous source of power in addition to a time or frequency reference. The common time or frequency reference can be important for synchronizing the timing and frequencies of the SNs 110 within the same vicinity, as described in more detail elsewhere herein.

The CDs may already perform various electronic operations, independent of the SNs 110. Accordingly, the additional silicon area required to add the positioning beacon/SN capability may not dramatically increase the cost of manufacturing. In addition, the SN 110 can leverage much of the common circuit circuitry already existing within the CD.

In an embodiment in which the SNs 110 are stand-alone devices, the SNs 110 can be hardwired to a continuous power source within the indoor environment 106 or can have an independent power supply such as a battery. As described elsewhere herein, some embodiments of the SNs 110 can have four or more antennas. A single SN 110 having four or more antennas can independently provide a three-dimensional position to the RN 102.

In some embodiments, the system 100 can allow an unlimited number of simultaneous users. That is, any number of RNs 102 can be present within the indoor environment 106 and use the SNs 110 to determine three-dimensional positions within the indoor environment 106.

The system 100 can be an indoor micro-location system providing high accuracy and high availability, and supporting an unlimited number of simultaneous users (e.g., multiple RNs 102), with high immunity to the multi-path indoor environment and easy installation by untrained persons. The system 100 can comprise Stationary Nodes (SN's), Roaming Nodes (RN's), and Calibration Nodes (CN's). The system 100 can also comprise a central management and applications server 110.

The SNs 110 can emit purpose-designed ranging signals using direct sequence spread spectrum (DSSS). An RN 102 entering and/or roaming within the indoor environment 106 receives these ranging signals from the stationary SNs and calculates its own three-dimensional location relative to the system datum. The system 100 can also have one or more Calibration Nodes (CN) 114. The CNs 114 can be similar to the RN 102 but have additional capabilities. They are used for calibration of the system upon installation. The indoor location system 100 uses an Unsynchronized Time Difference of Arrival (UTDOA) at the receiver within the RN 102 to determine the location of a Roaming Node (RN). The RN 102 within an area covered by a constellation of SNs 110 measures the timing of all of the ranging signals from all detected SNs 110. With knowledge of the physical locations of the SNs 110, the RN 102 is then able to calculate its own position relative to the system datum.

Unsynchronized Time Difference of Arrival (UTDOA)

In contrast to the UTDOA of system 100, Time of Arrival (TOA) systems assume that the SNs are all synchronized in both time and frequency. In addition, in TOA, it is also often assumed that the RN is synchronized in time and frequency with the SNs. This is generally inefficient. If all the clocks are synchronized, each SN tags its ranging signal transmission time on the transmitted signal. When received by the RN, the RN time stamps it with the receive time. Since all clocks are synchronized, the time difference between the tagged transmit time and the stamped receive time is the free air propagation time. Using the speed of light, the SN to RN distance can be calculated. Knowing the distance to three physically disjoint and non-co-linear SNs, the RN can calculate its position. In addition to timing the arrival of the signal, the RN needs to know the location of the SNs relative to the system datum. Therefore, there must be a way to communicate, to the RN, the locations of the SNs from which it is receiving ranging signals.

In practice, it is not efficient for the clock of the RN to be synchronized with the SNs. Hence the RN can only measure the difference between the times of arrival of the signals from the SNs, but cannot determine the absolute time of free air propagation due to the clock offset between the RN clock and the synchronized clocks of the SNs. Traditional Time Difference of Arrival (TDOA) solves this problem by requiring the RN to capture ranging signals from four SNs (i.e., instead of three SNs for TOA). Hence, one additional equation must be solved for the additional unknown clock bias.

In the system 100, the SNs 110 do not have to be synchronized. Instead, the clock and frequency offsets of the SNs 110 from one another can be somewhat random. However, each SN 110 continuously measures and broadcasts these time differences and frequency offsets, thereby enabling the RN 102 to calculate its position when it receives the ranging signal, along with broadcast correction from four SNs 110. Thus, in an embodiment, SNs 110 are not synchronized.

Advantages of UTDOA

The UTDOA of system 100 provides several important advantages. UTDOA makes it feasible to deploy the system 100 in an isolated island of coverage, called a constellation of SNs 110, without a managing server or a master SN. This facilitates easy installation, which may simply consist of placing a number of SNs 110 within an indoor environment 106.

UTDOA also handles the situations where neighboring constellations, without reliable RF visibility of each other, can still service the RN 102 that is within the coverage of both of them without requiring that the two neighboring constellations be themselves synchronized to a common reference.

Installation Without Server of Master Node

Advantageously, UTDOA enables the random deployment of SNs 110 without universal coordination. Early in deployment, the system 100 can resemble a number of disjoint islands (e.g., adjacent SNs 110 or adjacent constellations). Each of these islands may have its own sense of time and frequency. As these islands grow closer to each other, they start to detect each other. If, as in GPS, all the SNs 110 must synchronize to one universal clock, a universal clock must be selected. Also, even if two constellations agree on which time reference to follow and align themselves to one reference, they will start to drift apart as SNs 110 fail along the border so as to effectively disconnect the islands. An RN 102 that detects signals from both constellations would stop working.

Solving the Neighboring Constellations Issue

Another problem is that synchronization of a constellation within a disjoint island takes time. In systems that require global synchronization before becoming available, operation is delayed while all of the SNs 110 synchronize with each other. If the SNs 110 are embedded in CDs (e.g., light bulbs) that turn on the minute the user enters the room, waiting until full synchronization of all SNs 110 within the constellation would limit the utility of the system 100. But with UTDOA, a SN becomes immediately useful to the RN 102 upon powering up, because no synchronization is required.

In UTDOA, each SN 110 models the clock of other SNs 110, based on its own repeated measurements. Each SN 110 is able to project these measurements to times in between these measurements. Thus, less frequent broadcast updates of the continuously drifting offsets are required.

Apparent Time of Difference of Arrival

The measured pseudorandom number (PN) offsets are the apparent time difference of arrival. However, they include the free air propagation time between the two SNs 110, as well as the time difference between the internal clocks of the two SNs 110. The free air propagation delay will add to the measurements seen by either SN 110, while the internal clock time difference will add to the measurement seen by one side and subtract from the measurement seen by the other side. The RN 102, seeing the ranging signals and reading the Data Channels of the two SNs 110, can subtract these reported time measurements to cancel the free air propagation time, so as to end up with a quantity that is equal to twice the clock difference. The RN 102 may then use this clock difference to adjust the time of arrival of a ranging signal, all according to one time reference.

Insensitivity to Clock Reference Errors

Given that the frequencies need not be locked among the SNs 110, the time difference between the clocks of the SNs 110 may drift in time. A one part per million (1 ppm) error between the local reference oscillators will result in a 250 chips drift in one second. Given that the data frames containing information about these clock differences among SNs 110 come once a second, the information contained could have drifted slightly by the time it is used. For this reason, in an embodiment, the SNs 110 model the clock drifts based on the repeated code and carrier offset measurements, and broadcast the model parameters to allow for projected mutual time difference drift corrections among the detected SNs 110.

Advantages of Best Effort Frequency Alignment

While locking to one frequency is no longer necessary, it is recommended that SNs 110 within a constellation do a best effort to come as close as possible to one mutual frequency. Thus, the SNs 110 can drive the local reference oscillator to a value that is the median of the reference frequencies of all of the SNs 110 detected. Over time, the SNs 110 in a constellation will lock, or almost lock, in frequency. This is useful for lowering acquisition time for the RN 102 entering the constellation from a cold start. It also minimizes the drifting of time among the clocks of the SNs 110, thereby improving the accuracy of the reported time difference and improving the modeling of this drift in time. In addition, if the SNs 110 are close in frequency, their sense of time relative to each other drifts fairly slowly, which reduces the possibility of PN offset collision and the need to schedule PN jumps to avoid possible PN Offset collisions among SNs 110.

Forward Link Only Normal Operation

The RF link from one SN 110 to other SNs 110, RNs 102, and CNs 114 is called the Forward Link. The RF link from the RN 102 or CN 114 back to the SNs 110 is called the Reverse Link. In the system 100, the predominant mode of operation is to use the Forward Link only for position determination. Forward Link only operation allows an unlimited number of simultaneous users (e.g., RNs 102), for example, in a stadium or other crowded venue. It also allows each RN 102 to continually measure and track the ranging signals for very fine position determination averaging and improvement. Other systems that rely on round trip delay for positioning need to establish exclusive two-way links between RNs and SNs for every ranging measurement. This limits the number of users and the available accuracy, because dwelling on each link by a single user to improve accuracy would not be allowed in these two-way links.

The SNs 110 can also optionally emit Bluetooth™ or Wi-Fi™ packets that can aid in system acquisition and lower performance ranging applications.

In a typical TDOA system, such as the well-known GPS, the SNs must be synchronized in time and in frequency. In the system 100, the SNs 110 are not synchronized in time or frequency. Instead, an SN 110 listens to all other SNs 110 in the vicinity and continuously measures the time difference and frequency offset between itself and all other SNs 110 that it sees. This SN 110 can then continuously broadcast this information in one or more signals 116. The RN 102 can use these broadcast measurements to correct for the time and frequency measurement among the SNs 110 and can then perform the math as if the SNs 110 were synchronized in time and frequency. In other words, in the system 100, the RN 102 can assume that the SNs 110 are not synchronized and use the reported mutual SN 110 offset measurements (e.g., in the signals 116) in order to successfully calculate a position based on TDOA trilateration. This is referred to herein as Unsynchronized Time Difference of Arrival (UTDOA). The arrows representing signals 116 in FIG. 1 show that each SN 110 can transmit information to, and receive information from all of the other SNs 110 within range. The system 100 can use UTDOA to facilitate random deployment of adjacent SN 110 constellations without requiring a master coordinator or a master planner, because there is no concept of absolute time. In other words, another SN 110 can always be added, no SN 110 has a higher rank than any other SN 110, and each additional SN 110 does not need to figure out what is the correct absolute time that other SNs 110 are using. This greatly simplifies deployment and installation by the users.

In the indoor environment 106, it is anticipated that the main limit on accuracy may be multi-path. This multi-path can be combated by using wide signal bandwidth. For example, the ranging signal emitted by an SN 110 may be spread using a 250 Mega Chips Per Second (MCPS) spreading rate. The system 100 can implement the Direct Sequence Spread Spectrum (DSSS) technique to perform this spreading using a PN code. The spread signal is not filtered before transmission. The main sin(x)/x shaped spectral lobe spans 500 MHz of bandwidth. Including two more lobes—one on either side of the signal—results in a bandwidth that is 1 GHz wide. In an embodiment, this signal is centered at 4.0 GHz. In order not to interfere with the main users of the spectrum around 4.0 GHz, ranging signals may be transmitted below −50 decibel-milliwatts (dBm). This guarantees that the signal would be below the thermal background noise at room temperature for any receiver that is more than 1 meter away from a SN 110. It will also appear as noise to the receiver, given the wide band spreading of the signal.

Installation may consist of placing multiple SNs 110 within a vicinity such as the indoor environment 106. The position of these SNs 110 should be selected to optimize coverage. After installation and power up of the SN constellation, the installer may use a CN 114 to calibrate the system 100. Calibration of the system 100 involves finding out the locations of where the SNs 110 have been placed. This may be done by moving the CN 114 within the coverage area of an SN constellation in a pattern with a known relationship to the datum. The pattern may be derived from a prior installation of a different system 100. The CN 114 acts as an RN 102 and measures the timing of the ranging from each SN 110 at multiple known locations relative to the system datum. This generates sufficient information to calculate the three-dimensional position of each SN 110. This information is uploaded to each SN 110 so that each SN 110 can broadcast it to RNs 102 entering the indoor environment 106.

In some embodiments, the SN 110 can transmit one or more signals. In some implementations, the SN 110 can transmit at least four channels. These four channels may comprise a pilot channel, a Binary Offset Carrier (BOC) ranging channel, an acquisition channel, and a data channel.

Pilot Ranging Channel (Pilot). In an embodiment, this Pilot is spread at a rate of 250 MCPS. It uses a PN code derived from a 32nd order maximal polynomial generated by a 32-bit Linear Feedback Shift Register (LFSR). It is transmitted on the in-phase part of the carrier, i.e., on the I baseband channel. The 32-bit PN code has an untruncated LFSR period of $2^{32}-1$ chips.

BOC Ranging Channel (BOC). The BOC channel uses Binary Offset Carrier modulation, hence the name. As compared to the Pilot spreading rate, the BOC channel uses BOC(0.5,1). In other words, this BOC uses an LFSR generated PN code with a spreading rate of 125 MCPS that is then multiplied by a 250 MHz square wave. The BOC uses a 32nd order spreading polynomial. This means that the BOC has a period of $2^{32}-1$ BOC chips, or $2\times(2^{32}-1)=2^{33}-2$ Pilot Chips. The system design uses the Pilot to aid in the decoding of the BOC channel. This is important since detecting the arrival peak of a BOC signal can result in ambiguities due to the multiple correlation peaks of a BOC signal. Therefore, the system may fully determine the timing of the yet to be acquired BOC signal once the Pilot timing is acquired. Hence, the timing of the BOC and the Pilot should be fully synchronous. Since the LFSR for the BOC runs at half the spreading rate of the Pilot, and since both use a 32-bit LFSR, the Pilot code rolls over twice for each time that the BOC code rolls over once. This means that once the Pilot timing is acquired, the timing of the BOC can have one of two possibilities. These two possibilities are exactly half the BOC PN roll apart. The BOC energy may be searched within these two possibilities to resolve this ambiguity. Notably, the inherent ambiguity in a BOC(0.5,1), stemming from having several peaks around the main peak, is orthogonal to the two-position ambiguity between the Pilot and BOC which is exactly one half of a BOC PN Roll apart. Therefore, once the BOC energy is found in one of the two possibilities, the Pilot timing shows exactly where the center peak of the BOC is. Thus, the system 100 is robust against the BOC multiple peak searching ambiguity.

The above method of looking for BOC energy in one of two places, once the Pilot is acquired, assumes that the Data Channel has not been acquired. If the Data Channel has already been acquired, the BOC timing is known without any ambiguity as shall be demonstrated later from the structure of the Data Channel.

The BOC channel is rich in higher frequency components and puts more power in the areas of the spectrum that are sparsely populated by the Pilot, Acquisition Channel (AC), and Data Channel (DC). The higher frequency components allow for a better estimation of ranging time. The BOC is intended to be used when the available signal-to-noise ratio (SNR) and the desired accuracy are both high. The BOC, like the Pilot, is transmitted on the in-phase part (I) of the carrier. An additional advantage of the BOC is that, spectrally, it mainly resides where the Pilot does not, and therefore, the BOC provides higher performance when utilized, with little SNR penalty to the Pilot under normal operation. The BOC is transmitted at a power level that is lower relative to the Pilot Channel.

Acquisition Channel (AC). The acquisition channel is designed to aid in the acquisition of the Pilot. The Acquisition Channel is spread at the same rate as the Pilot, at the rate of 250 MCPS. However, the Acquisition Channel uses a shorter polynomial with a shorter period. The Acquisition Channel uses a 16th order polynomial governing a 16-bit LFSR PN generator that is spread at a rate of 250 MCPS.

Hence, the period of AC code is 2^16−1=65535 chips. This period divides the period of the Pilot long code, and therefore, the two stay in alignment perpetually.

The Acquisition Channel is transmitted at a power level that is lower relative to the Pilot. The Acquisition Channel is transmitted at this lower power because it is mainly used by an RN 102 in acquisition of the first SN 110 in a constellation from cold start. Hence, it is expected that the first SN 110 that the RN 102 sees, and the only Acquisition Channel it needs to see, would be a close-by SN 110 with high SNR. The Acquisition Channel is transmitted on the quadrature-phase of the carrier, i.e., the Q channel.

Data Channel (DC). This channel transmits information required by the receivers for position determination. It also transmits aiding data to help receivers acquire the ranging signals of other neighboring SNs 110 more efficiently. The DC is spread using a 32nd order polynomial, that is different from the polynomial used by the Pilot, and is spread at a rate of 250 MCPS using a 32-bit LFSR. This channel carries data bits containing information that is needed by the RN 102 for a successful RN position determination. The period of each data bit must have a known relationship to the Pilot long code in order for the Pilot to serve as the main timing reference. The RN 102 can first acquire the AC channel to narrow down the search for the Pilot. After acquiring the Pilot, the RN 102 uses the timing of the Pilot to deduce the timing of the Data Channel. As shall be demonstrated later, based on processing gain requirements and required data rate, each bit in the Data Channel spans 131070 chips. Dividing the long code period by 131070 yields 32768.5. This means that there are 32768.5 bits within every Pilot PN roll. The bit boundary lines up with every even Pilot PN roll. Hence, after acquiring the Pilot, the timing of the Data Channel is known with one of two option ambiguity.

An example of some of the data that may be transmitted on this Data Channel is the physical position of the SN 110 and the timing offsets between itself and its neighboring SNs 110 as measured by this SN 110. The Data Channel may also provide aiding information to assist the receiving RNs 102 in acquiring the ranging signals of other neighboring SNs 110. The Data Channel is transmitted in quadrature-phase of the carrier, i.e., on the Q channel. The power level of the Data Channel is equal to that of the Pilot.

Forward and Reverse Link Operation

In an embodiment, the system 100 is flexibly designed to allow ranging operations using the Reverse Link. For example, the RN 102 can emit ranging signals to be used by SNs 110 and other RNs 102 in the vicinity. This can be advantageous under some circumstances.

This can happen in two modes:
Sporadic Reverse Link Mode (SRM): the RNs 102 infrequently transmit on the Reverse Link.
Continuous Reverse Link Mode (CRM): the RNs 102 continuously transmit on the Reverse Link.

In SRM, the RN 102 sporadically, and for a relatively short time, transmits on the Reverse Link when needed. This is useful for the RNs 102 to instantly synchronize to the absolute carrier phase of the SNs upon entering an indoor environment 106. This mode can be supported even in crowded deployments, since the Reverse Link is only used briefly by the RN 102 to synchronize to absolute phase. The RN 102 subsequently relies on phase tracking to maintain synchronization with the absolute carrier phase. In addition, CDMA allows simultaneous use of the Reverse Link by multiple RNs 102.

SRM is a very powerful mode of operation for the system 100. The RN 102 transmitting on the Reverse Link may use the reciprocal long code PN offset that it measures from the SN 110 with which it is intending to reverse communicate. This make acquisition trivial at the receiving SN 110. The Reverse Link signal also has a known phase relationship to the carrier phase of the SN 110 as detected by this RN 102.

The main reason for SRM, is to provide absolute carrier phase information to the RN 120. The RN 102 needs to do that with only one SN 110 in the constellation, since the carrier phase differences among the SNs 110 within a constellation is being continuously measured and broadcast. The RN 102 may select the SN 110 with the highest SNR and transmit a Reverse Link with a PN offset that is very close to that of the selected SN 110. The SN 110 expecting SRM Reverse Link operation continuously searches for Reverse Link traffic with a PN offset very close to its own. When it acquires a Reverse Link signal, this SN 110 starts to broadcast, on its own Data Channel (DC), the time and carrier offset measurement of this Reverse Link compared to its own Pilot. This data provides the RN 102 that is sending the Reverse Link with enough information to determine the absolute time and frequency offset between itself and this SN 110. It also allows this RN 102 to immediately know the absolute difference in both time and frequency between itself and all of the other visible SNs 110 within a constellation. Once this is determined, the RN 102 may stop transmitting on the Reverse Link and maintain carrier and code phase lock by tracking. The transmitting RN 102 uses power control based on the strength of the received signal from the SN 110 to which it is sending the Reverse Link traffic, in order to reduce the interference with other devices and increase multiuser operation.

In CRM, the RNs 102 act like the SNs 110. Multiple RNs 102 can simultaneously transmit on the Reverse Link due to the multiuser support of Code Division Multiple Access (CDMA) modulation used in the system. This can double the number of measurements and, in cases where RNs 102 can use ranging signals from other RNs 102, it can improve the coverage.

In CRM, the RN 102 acts like an SN 110. The only difference is that the RN 102 performing CRM needs to frequently update its location and continually broadcast this update to other SNs 110 or RNs 102. That is because, unlike SNs 110, an RN 102 is assumed to be moving. All other aspects of operation are the same as that of an SN 110 on the Forward Link with the exception of using difference spreading polynomials on the Reverse Link. This mode is useful in sparse coverage areas with a sparse number of users, such as in residential places. It is also very useful in an indoor automation environment where some robots (as RNs 102) can provide ranging signals to other robots that may be partially shadowed from an SN constellation, to thereby increase availability.

In either mode, RNs 102, operating according to the predominant mode of the system 100 using only the Forward Link, are totally unaffected. In other words, the system 100 can support the Reverse Link modes for some RNs 102 while still supporting an infinite number of Forward-Link-only RNs 102. These Reverse Link transmissions may also include a Data Channel with similar content to the Forward Link.

In CRM, the Acquisition Channel (AC) is transmitted. However, in SRM, the Acquisition Channel is unnecessary, and may not be transmitted.

In an embodiment, there is a field in the Data Channel of SNs 110 that indicates to the listening RNs 102 whether transmission on the Reverse Link is allowed or not within the vicinity. For example, in large venues with a good coverage of SNs 110 and potentially lots of simultaneous users (e.g., in a stadium), the system 100 may be configured not to allow Reverse Link transmissions or only allow limited use of the Reverse Link. Conversely, in environments in which the number of simultaneous users is low, the system 100 may allow Reverse Link transmissions to improve coverage and accuracy.

In embodiments of the system 100 that comprise the server 120, the server 120 may manage the permissions for RNs 102 to use the Reverse Link. In the absence of the server 120, each SN 110 may decide locally whether or not to support Reverse Link operation.

BILE Advertising Packets

Optionally, the SNs 110 can additionally emit Bluetooth™ Low Energy (BTLE) Advertising Packets, referred to herein as Bluetooth™ LE Packets (BTLE Packets). As specified in the BTLE standard, these BTLE Packets do not need to coordinate with other BTLE activities, and therefore, can be transmitted whenever the channel is clear and can contain the data payload that needs to be transmitted. These Packets are transmitted within the 2.4 GHz ISM band several times per second, as much as 10 times per second, at +10 dBm. These BTLE Packets have at least two uses, including:

Aid the RN 102 in acquiring the ranging signal of an SN 110.

Allow simple RNs 102 with only Bluetooth™ receivers to use the system 100 for position location.

Acquisition Aiding with BILE Packets

The first use of these BTLE Packets is to reduce the system acquisition time of an RN 102 entering an SN constellation for the first time. These BTLE Packets advertise the existence of an SN 110, along with aiding information to help the RN 102 acquire the main SN ranging signals, because in the SN 110 the transmission times of these BTLE Packets is very finely aligned with the timing of the wideband ranging signal.

A BTLE Packet may contain information in its payload that indicates the exact PN offset state of the originating SN 110 at the time of the transmission of this BTLE Packet. Even with commercially present BTLE receivers without additional tight timing, the BTLE Packet arrival time can be estimated to better than 1 microsecond. In conjunction with the payload data that informs the RN 102 of the precise time the BTLE Packet was transmitted, this narrows the Pilot search window at the RN 102 to less than 250 Chips. This facilitates instant acquisition by the RN 102 of the Pilot Channel for the SN 110 from which the BTLE Packet was transmitted.

In addition to the above, if the carrier phase progression of these BTLE Packets is measured from packet to packet, the RN 102 is able to estimate the frequency offset of the SN 110 relative to the RN 102 and reduce or eliminate the need for frequency offset searching.

Position Determination with BILE Packets

In an embodiment, the payload of the BTLE Packet contains enough information for the RN 4102 to compute its location without demodulating the Data Channel. Actually, if the transmit timing of the BTLE Packet was precisely coordinated with the PN code in the SN 110, and if the arrival time is also precisely timed with the RN's local PN timing, and given the precision of the reported PN frequency offset within the payload packet, the BTLE Packets can be used to determine relatively accurate positioning without even demodulating the high bandwidth ranging signal. This is because, similar to the relative timing among PN codes in SNs 110 within a constellation, the relative transmission timing of these BTLE Packets from SNs 110 within a constellation is just as precisely timed. In addition, the relative time and frequency differences among neighbors may also be broadcast in their BTLE Packets. That means a Bluetooth™ receiver with precise firmware timing should be able to yield a very accurate position. This may not yield the same accuracy or robustness against multi-path as the wide band ranging signal, but it should yield much more accurate positioning than what is currently possible with Bluetooth™ LE using RSSI. Requiring only Bluetooth™ receivers, this mode allows a much faster penetration into the smart phone market, since implementation of the above is predicted to be a firmware change in the current Bluetooth™ modem chips within smart phones rather than a hardware change.

This should facilitate early adoption by the smart phone market for applications not needing the robustness and the multi-path resistance of the wide-band ranging signals. The tight synchronization of these BTLE Packets will result in a much better location determination as compared to any other currently existing system using BTLE Packets. Given that the timing of these BTLE Packets shall be used for ranging and not just for acquisition aiding, the BTLE receiver should have a much tighter estimate on their arrival times than what is currently specified for the general BTLE standard. This is further detailed elsewhere herein.

Issues with BILE Packets for Ranging

As previously mentioned, the BTLE Packets can be used as ranging signals. This is because the transmission of these Packets can be timed very precisely relative to each other. This can be done because the SNs 110 within a constellation continuously measure and report their relative code, carrier, and frequency offset among each other using the wideband ranging signal. By reporting the time instant that the BTLE Packet was transmitted, relative to the internal PN offset of the originating SN 110, the precise timing of this event is known relative to all of the SNs 110 in the constellation. When BTLE Packets are used to assist with acquisition of the ranging signals, only one of them needs to be seen once a second or so. For this reason, it is more than sufficient if each SN 110 transmits a BTLE Packet once a second. Furthermore, there is no requirement to have these BTLE Packets bunch up together. The BTLE Packet transmission from various SNs 110 could arrive as much as half a second apart on average. For ranging purposes, the system 100 might still only require each SN 110 to transmit a BTLE Packet once a second, but with an additional requirement that these BTLE Packets be transmitted as close to each other in time as possible. This requirement is important to minimize the location error. In an embodiment, BTLE Packets are transmitted as much as 10 times per second from each SN 110 for both acquisition aiding and ranging.

Using synchronized BTLE Packets to determine location is the same as using the wideband ranging signal, in that the RN 102 needs to receive signals from no less than four SNs 110 to arrive at a solution. The RN 102 using the wideband ranging signal compares the time difference of arrival between the ranging signal as seen at the same instant in time. The assumption is that signals from all of the visible SNs 110 were measured at the same exact instant. This assumption can be made because the ranging signals are continuously emitted, and hence, an RN 102 is always able to detect them simultaneously and to tell them apart because of their CDMA structure. However, this is not the case inside a Bluetooth™ receiver, since a Bluetooth™ receiver can only receive one BTLE Packet at a time. Therefore, the pseudo range measurements are taken at different instants in time. Since each BTLE Packet knows when it was transmitted and communicates that to the RN 102 and since all the time offsets among the SNs 110 are measured and reported, the RN 102 can adjust for the different pseudo range measurement times, with the exception of the error associated with the reference oscillator offset between the constellation and the RN 102.

An example will be described. Assume one BTLE Packet was transmitted by an SN 110 at time to according to the clock of the transmitting SN 110, and a second BTLE Packet was transmitted from the same SN 110 at time $t_1$ according to this SN's clock. Further assume that the first BTLE Packet was received by the RN 102 at time $t_2$ according to the clock of the receiving RN 102, and the second BTLE Packet is received at time $t_3$ according to this RN's clock. The time of flight for the first BTLE Packet is $(t_2-t_0-t_d)$, and the second BTLE Packet time of flight is $(t_3-t_1-t_d)$, where $t_d$ is the time error between the RN's clock and the SN's clock. However, $t_d$ changes with time if the RN 102 and SNs 110 have frequency offsets between their reference oscillators. A 1 ppm error adds up to a 1 microsecond error in one second. If it is assumed that BTLE Packets are, statistically, 0.05 seconds apart on average, there would a 0.12 microsecond difference in $t_d$ from one BTLE Packet reception to the other. An uncompensated error of 0.12 microseconds in timing is equal to an error of 36 meters in the pseudo range measurement.

In the example above, the two BTLE Packets came from the same SN 110. In practice, the BTLE Packets would come from two SNs 110 that have a time offset between them. However, the broadcast offset measurements allow this two-SN situation to become equivalent to the case of BTLE Packets coming from one SN 110. The error resulting from disjoint measurement times may be addressed by using one or any combination of the following techniques:

Reduce the time between the transmission of BTLE Packets for one location measurement.

Have the RN 102 estimate the frequency offset between itself and each of the SNs 110 transmitting the BTLE Packets.

Use signals from at least five BTLE Packets instead of four.

Reducing Inter BILE Packet Elapsed Time

In an embodiment, the time between the transmission of BTLE Packets for one location measurement is reduced. In other words, the system 100 attempts to have the transmission time of differing BTLE Packets be as close to each other as possible. A 0.05-second BTLE Packet time separation can lead to as much as a 36-meter measurement error. If the spacing between BTLE Packet transmission from different SNs 110 is, instead, 1 millisecond apart, a 1 ppm clock error leads to 1 ns of time error, which is equal to 1 foot of measurement error. There is an additional reason to reduce the time between BTLE Packet transmissions that is used in the same position calculation. This is because RNs 102, carried by users, may move. For example, in 0.1 seconds, a person walking at average speed moves by 0.14 meters. A running person can move up to 0.6 meters in 0.1 seconds. BTLE Packets participating in the same position determination calculations and arriving within 1 millisecond of each other would reduce the error due to a user running to 6 cm.

Grouping the BILE Packets Transmission Times

Grouping the transmission times of BTLE Packets to occur close to each other is necessary for useful position calculation when using a BTLE-only mode. This is because the BTLE Packet from a given SN 110 is transmitted infrequently on the order of 10 times per second. A person can walk at an average speed of 1.4 meters per second. If the BTLE Packets from each SN 110 have a random relationship to each other, the expected value for mutual BTLE Packet separation would be 0.05 seconds. In 0.05 seconds, a person might have moved by 7 cm. This might be acceptable for most applications, but if the transmission within a constellation are grouped more tightly, the accuracy improves, especially for fast moving RNs 102. The trick is to attempt to group the transmissions without having a master scheduler for them. Up until this point, it has been assumed that all SNs 110 run the same software and have the same role as every other SN 110. In other words, within a constellation, all SNs 110 are equal and are equally dispensable. In an embodiment, this is always the case in system 100.

In an embodiment, every 2 seconds, each SN 110 generates a random number from 0 to 255 and places it in the two subsequent data frames. These random numbers are seen by all SNs 110. The SN 110 with the lowest number picks a random interval that is between 0.15 and 0.05 seconds. All other SNs 110 wait for this SN 110 to transmit the BTLE Packet. When this SN 110 transmits the BTLE Packet, other SNs 110 detect this BTLE Packet, and the other SNs 110 all follow by transmitting their own BTLE Packets in the order dictated by the ascending order of their random numbers. If two SNs 110 generate the same random number, the one with the lowest value MAC address goes first. This order continues for 2 seconds. Then, another random lot is performed and the cycle repeats. This mechanism groups the transmission of BTLE Packets from various SNs 110 so as to follow each other. At the same time, its distributed nature makes it robust to single point failure. It is expected that these BTLE Packet transmissions will be within 3 milliseconds of each other, and hence, greatly improve the location determination accuracy.

Estimate RN to SN Frequency Offsets During BLTE-Only Mode

In an embodiment, the RN 102 estimates the frequency offset between itself and the constellation of SNs 110 transmitting the BTLE Packets. At the 2.4 GHz ISM band, a 1 ppm reference oscillator error results in a 2400 Hz carrier offset. Since the BTLE Packets were synchronously transmitted from each SN 110, it can be assumed that the phase at the beginning of each packet is predictable if the RN's reference oscillator did not have an error relative to the SN's. After a few seconds of receiving the BTLE Packets from SNs 110, the RN 102 can estimate the frequency offset from the SNs 110, as it examines the evolution of the phase at the same place within the BTLE Packet relative to other BTLE Packets. If the estimate of this frequency estimate reaches 100 Hz of uncertainty, the time error drops from 0.5 microseconds in one second to 20 nanoseconds or 20 feet in one second. If the time in between BTLE Packet transmissions was within 10 milliseconds, the distance error would be 0.2 feet or 2.4 inches. So, by reducing the time between BTLE Packet transmissions from various SNs 110 and by better estimation of frequency offset, the error that results from the BTLE Packets not being simultaneously received at the RN 102 can be reduced.

Using Ranging Signals from Five SNs

Signals from at least five BTLE Packets (e.g., instead of four) can be used. The frequency offset can be reduced by either estimating it, or minimizing its impact on accuracy by using BTLE Packets that are close to each other in time. Another way is to solve for it. A minimum of four SNs 110 were needed for the broadband ranging signal, since it was necessary to solve for X, Y, Z and $t_d$ to compute the location of the RN 102. With BTLE Packets, the system 100 must also solve for r, which is the rate of change between the RN's clock and the SN's clock. The $t_d$ evolves in time according to $t_d = t_{d0} + rt$, in which r is in units of accumulated error seconds per second, and $t_{d0}$ is the current offset between the RN and SN clocks. The $t_d$ can be replaced in the trilateration equations with $t_d = t_{d0} + rt$ for each measurement. Notably, t is the time that the BTLE Packet measurement was taken and is difference for every BTLE Packet measurement. However, there is enough information from the messages in the BTLE Packet to precisely know t. Hence, there are only five unknowns despite t being different for each BTLE Packet measurement. These five unknowns are X, Y, Z, $t_d$ and r. By using five SNs 110, the system 100 can solve this set of equations to calculate X, Y, and Z for RN 102.

Perfect Absolute Frequency Knowledge not Necessary for BILE Ranging

As stated previously, it is not necessary to know the frequency error of the reference oscillator of an SN 110. In an embodiment, it is only necessary to know the frequency offsets among SNs 110 within a constellation, relative to each other, and to broadcast this information. The same holds for determining location using BTLE. As explained above, estimation or calculation of r is crucial to getting meaningful position determination. It turns out that the impact of frequency error, compared to perfect frequency, is minimal. If the SNs 110 had large frequency offsets compared to a perfect frequency reference, the error would be minimal. For example, assume a very large 100 ppm error exists between an SN 110 and a perfect frequency reference. If the relative frequency offset between the SN 110 and an RN 102 are measured and corrected for, this 100 ppm error would only add 100 PPM error over the measured distance due to errors in calculating distance traveled using the speed of light and time travel. In summary, knowing frequency offsets among the SNs 110 and RNs 102 is important, but knowing the error between the same group and an absolute perfect reference is not important.

Using Wi-Fi™ for Ranging

The description of using BTLE Packets for ranging applies equally to using Wi-Fi™ packets for ranging. The transmissions of these Wi-Fi™ packets may be timed very tightly with the SN's internal PN code, in the same manner as described above for the BTLE Packets. In addition, the same issues that arose when using BTLE Packets arise when using Wi-Fi™ packets, and can be addressed in the same manner as discussed above with respect to BTLE Packets. The advantage of Wi-Fi™ over BTLE is that Bluetooth™ transmits with 1 MHz bandwidth. This limits the accuracy of a system 100 relying only on BTLE Packets. In contrast, the Wi-Fi™ standard allows operation with a bandwidth of 20 MHz for the basic modes, or 40 MHz for enhanced modes, and as high as 160 MHz of bandwidth in the 5 GHz band for the latest versions of the standard. At 160 MHz, well-timed Wi-Fi™ packets have the potential for good accuracy. Notably, for both the BTLE and Wi-Fi™ modes, the SNs 110 still measure the timing difference among themselves and report it in the BTLE and Wi-Fi™ packets, respectively. These measurements among the SNs 110 may be done using the wideband ranging signal (RS) of the SNs 110. In other words, even though the RN 102 does not need to demodulate the ranging signal to determine its position, the SNs 110 use the ranging signals of each other to measure time and frequency offsets among each other.

Location Server

The system 100, described above, contains all the necessary components to yield a working solution. This system design was guided by the goal of allowing any consumer to easily deploy the system 100 in a residential environment. Therefore, great effort was spent in trying to make that deployment as simple as possible, for example, requiring no server or Wi-Fi™ or Bluetooth™ pairing procedures. The fact that the system 100 does not need a server in residential deployments also guarantees the privacy of users in their own homes. This is because, in an embodiment, the position determination is calculated in the RN 102, and with Forward Link only operations. The SNs 110 have no idea what RNs 102 are within their coverage area.

However, there are advantages to having a server for commercial deployments. Thus, while a preferred implementation of the system 100 may omit server 120, alternative implementations of the system 100 may comprise a server 120. This server 120 can either be one central server, owned and operated in a central location and serving multiple deployments, or it can be a server owned and deployed by the consumer and running licensed software with managed access in case of required maintenance.

Server Aided System Acquisition and Position Determination

In embodiments of system 100 that comprise server 120, the SNs 110 may communicate with the server 120 using Wi-Fi™ transceivers that relay communications through the nearest Wi-Fi™ router. The RN 102, operating in the indoor environment 106 managed by the server 120, "sniffs" for BTLE Pilots or Wi-Fi™ packets from SNs 110 advertising their presence. When the RN 102 detects a packet that it recognizes as coming from an SN 110, it may contact the server 102 and inquire about the SN 110 using the Bluetooth™ or Wi-Fi™ Media Access Control (MAC) address of the detected SN 110. The server 120 can then provide aiding information to the RN 102 to help acquire the constellation of SNs 110. This aiding information may comprise all of the SNs 110 within the RN's vicinity, along with their timing and frequency offsets relative to one another. This speeds up system acquisition and position determination, since the RN 102 does not need to wait to get all the necessary data from the SN's Data Channel. Rather, the RN 102 can get all of this necessary data from the server 120. Also, the Wi-Fi™ link from the server 120 has a much higher data rate than the Data Channel of the SN 110, and hence, can get all the necessary information and possibly more (e.g., for a large set of neighbors) in a very short time, compared to the Data Channel of the ranging signal of the SN 110.

Server Higher Level Applications

Once the RN 102 is able to determine its location, it may optionally transmit the data and the results to the server 102. This location information can be used by the server 120 for higher level applications running on the commercial server 120 to provide services based on the computed location of the RN 102. In an embodiment, these higher level applications may provide one or more services based on computed locations received from a plurality of such RNs 102.

System Calibration Assistance and Continuous Improvement

The location information fed back to the server 120 by the RN(s) 102 may also used to continually tune the system 100 towards higher accuracy and increased speed of acquisition. The server 120 may also provide continuous calibration refinement post-installation by utilizing all the reported measurements from all of the participating SNs 110, RNs 102, and CNs 114. The server 120 can also speedup initial calibration. When a server 120 is utilized, a new installation can be calibrated relative to a datum in the building. For example, this datum could be at the entrance of the building. CN 114 can be used to make this initial calibration. After that, the computed location of an RN 102, which is roaming within the building, can be used to automatically extend the calibration deep into the building. That is because, when this RN 102 enters the building, it receives ranging signals form the SNs 110 near the entrance that were calibrated by the CN 114 upon installation. As this RN 102 moves into the building, it leverages its currently known location to calibrate SNs 110 that are deeper within the building and which have not yet been calibrated. The more RN traffic that occurs within the building, the more the calibration map of the system 100 is extended deeper and deeper into the building. Notably, this method will accumulate errors in proportion to the distance from the originally calibrated SNs 110. At that point, another calibration can be performed with a CN 114 at another internal datum in the building with a known relationship to the original datum at the entrance of the building. This accurately anchors the adjacent SN s110, and the accuracy of the calibration map may be recovered from that point inwards.

In summary, a server 120 allows the calibration of the whole building by calibrating a few points and leaving normal RN traffic to fill the calibration holes and continuously improve the calibration map in the course of normal operation. In a residential setup without a server 120, the RN 102 (e.g., a smart phone) can comprise an application extension that keeps track of the SN calibration and continues to improve the SN calibration during normal usage. Using the above mechanisms, the installation and calibration of the system 100 is automatic and self-annealing.

Ranging Signal Details

In an embodiment, each SN 110 continuously emits a proprietary ranging signal (RS). The ranging signal may contain four channels. The first channel is the Pilot Channel (PC), the second is the BOC Channel (BC), the third is the Acquisition Channel (AC), and the fourth is the Data Channel (DC). The Pilot and the BOC channels may be modulated on the I baseband channel and the Acquisitions and Data channels may be modulated on the Q baseband Channel.

Ranging Signal PN Offset

In an embodiment, all PN spreading codes in the system 100 are generated from maximal polynomials where the LFSR runs for the full period before rolling over. For LFSR's, the period would be $2^n-1$, where n is the order of the polynomial and is also the length of the LFSR in bits. As mentioned earlier, the Pilot Channel may use a 32-bit LFSR clocked at 250 MCPS, the BOC Channel may use a 32-bit LFSR clocked at 125 MCPS inside its BOC generator before applying the 250 MHz square wave, the Acquisition Channel (AC) may use a 16-bit LFSR that is clocked at 250 MCPS, and the Data Channel (DC) may use a 32-bit LFSR clocked at 250 MCPS. None of the LFSR code generators are reset prematurely or extended (i.e., by insertion of zeros or ones). All generators complete their natural $2^n-1$ period before rolling over. All the codes are started at the same time. The BOC period is double in time with respect to the period of the Pilot. Thus, once started the BOC period and Pilot period will maintain a fixed relationship, except for the trivially resolvable odd/even ambiguity. Also, the period of the AC divides the period of the Pilot since $(2^{32}-1)(2^{16}-1)=2^{16}+1$. Hence, the AC and the Pilot also maintain a fixed relationship once started.

From the above, it is demonstrated that the system 100 can implement Code Division Multiple Access (CDMA) techniques in the structure of its signals. In CDMA, multiple users, using the same channel, can be distinguished from one another by either using different spreading polynomials (i.e., different codes), or by using the same code but having a different PN offset among the users. In the system 100, a receiver needs to distinguish the ranging signals from multiple SNs 110. In addition, within a single ranging signal coming from a specific node, the receiver needs to separate the Pilot, the BOC, the AC, and the Data channels to examine them separately. In an embodiment of the system 100, the Pilot, BOC, AC, and Data channels are distinguished from one another by using different spreading polynomials. The same four polynomials are used for all Forward Link channels throughout the system 100, while a different set of four polynomials are used for all Reverse Link channels throughout the system 100. The system 100 relies on differing PN offsets to distinguish among the same channels that come from differing SNs 110 or other nodes.

Random PN Offset of Ranging Signal Channels

The ranging signal can rely on differing PN offsets to distinguish signals from differing nodes. Rather than allocating a specific PN offset to each node, the system 100 may allow each node to randomly pick its PN offset upon power up. Accordingly, there is no central control, and no node has a higher rank than any other node. Hence, the system 100 does not require an entity to assign PN offsets to powering up nodes and to manage this resource. The system 100 should survive nodes joining and dropping out of a constellation unpredictably. Given that the PN offsets are picked at random, there is a possibility that two SNs 110 would choose a PN offset that appears identical to a receiver, and hence, make it impossible to tell the two SNs 110 apart. However, at least for the Pilot, BOC, and Data channels, the possibility of collision is fairly low. If the system 100 is assumed to contain a very exaggerated twenty or so visible and equally strong SNs 110, a minimum separation of 83.4 chips due to a maximum 100 meter separation between the nearest and the farthest nodes, and a 250 MCPS spreading rate, the probability of a PN offset collision between two nodes is $(20 \times 83.4)(2^{32}-1)$ or 1 in 2.6 million.

However, the probability of a PN offset collision for the Acquisition Channel is much higher, and collisions do occur frequently, given that the nodes are not locked in frequency and the much shorter AC PN code period of $2^{16}-1$. However, collisions on the Acquisition Channels are benign. The short PN period of the Acquisition Channel was designed to aid in system acquisition. After acquisition of the Acquisition Channel, the search for the Pilot Channel is narrowed down significantly. In an embodiment, the acquisition algorithm first tries to acquire the Acquisition Channel. Having detected energy in one search bin, the acquisition algorithm resolves the timing of the Pilot with the aid of the detected short code timing of the acquired Acquisition Channel. Whether the successful search bin has a signal from one SN 110 or multiple SNs 110, the next steps are the same. Specifically, in the next step, the acquisition algorithm would immediately know whether or not the bin contained energy from more than one SN 110, because while AC PN offsets may frequently collide, the PN offsets of Pilots are unlikely to collide as demonstrated above. Nonetheless, the methodology for resolving PN offset collisions among Pilot Channels from multiple SNs 110 is detailed below.

PN Offset Collision Resolution

In an embodiment, when an SN 110 powers up, it loads its LFSR with a random initial state and starts the PN generator, but does not yet turn on its transmitter. The SN 110 then listens to other SNs 110 nearby that are already operating. In cases where the powering-up SN's PN roll is within 128 chips of the PN roll of another SN 110, the powering-up SN 110 performs an LFSR random jump. Notably, because the SNs 110 are not frequency locked, their relative PN offset will change over time and by as much as 250 chips per second given a 1 PPM relative frequency offset among their reference oscillators.

Therefore, during normal operation and after powering up, each SN 110 may continuously monitor its PN offset position relative to all other SNs 110 it sees. If any SN 110 comes within a 128-chip PN offset relative to a neighboring SN 110, the SN 110 with the lower value MAC address may execute a collision avoiding PN code jump. While the example of the lower value MAC address is used, one or more other predefined criteria may be used to select the SN 110 to perform the PN code jump. In any case, it is a random PN jump in which a random PN that does not conflict with other visible SNs 110 is chosen for the new PN offset. This jump is done in a synchronous way to ensure that the new state is consistent with the new offset measurements that are being broadcast.

There is no limit on how often this can be done, as long as the reported measurement is always consistent with the new state of the LFSR. The chosen offset and the future time of its application may be communicated ahead of time in one of the data fields in the Data Channel to notify all receivers in advance. Notably, during this PN jump, the PN generators of the Pilot, BOC, AC, and Data channels may all jump simultaneously and by the same amount to maintain their relationship to each other. Planned PN jumps occur only on the Data Frame boundaries. Therefore, these planned PN jumps have the opportunity to occur about once every second.

Maximal Code Decimation

In an embodiment, the PN generators of all the channels run over the full maximal period of $2^n-1$ chips before they repeat again. Unlike GPS, the long code is not reset at any point in the sequence. Unlike terrestrial CDMA cell service, zeros or ones are not inserted as padding at the end of the code rolls. Thus, the full characteristics of a maximal LFSR code are maintained.

One key retained feature is the decimation ability. If instead of sampling every chip at the receiver, sampling is decimated by an integer factor (e.g., sample every 5th chip), the result is a PN sequence that is still a replica of the original PN sequence but shifted in time. This might be useful for simple devices that use cheaper analog-to-digital convertors (ADCs) and lower processing capabilities than what would be needed to process a 250 MCPS signal with its full bandwidth.

Position Computation Update Rate and Processing Gain

In an embodiment, the system 100 supports relatively slow moving RNs 102, as well as fast moving RNs 102 (e.g., building automation, robots, drones, etc.). A rule of thumb for drones is that a navigational sensor update rate of about 100 times per second is more than adequate for most applications. For the Pilot Channel, at 250 MCPS, correlations would be around 2,500,000 chips long or less to support this update rate. At 2,500,000 chips per correlation, a processing gain of around 64 dB is achieved for the Pilot Channel. In cases of higher available SNRs, this correlation length can be reduced at the receiver. Also, for slow moving RNs 102, this default Pilot Channel receiver correlation length can be increased to obtain higher processing gains under low SNR conditions. Both can be done because the Pilot Channel is not modulated by any data bits.

The Pilot Channel PN code may be chosen to appear as if it is infinite in length when correlated over variable times below one second. As just stated, depending on the necessary SNR, the correlation could be shorter or longer since the Pilot Channel does not carry any data modulation. For the SN 110, the phase relationship between the PN code and the carrier must be fixed for the Pilot and BOC channels to facilitate carrier phase ranging techniques. Therefore, the center carrier frequency of the SN 110 must be an integer multiple of the PN spreading rate. In an embodiment, the center carrier frequency is 4 GHz, which is sixteen times the Pilot spreading rate of 250 MCPS.

Pilot Channel (PC)

In an embodiment, the Pilot ranging channel is designed purely for the ranging purpose. It may be binary phase-shift keying (BPSK) modulated on the I baseband channel. The Pilot Channel may be spread using a pseudo random number sequence (PN) that is generated by a maximal length polynomial using a Linear Feedback Shift Register (LFSR). The spreading may employ Direct Sequence Spread Spectrum (DSSS) technique. The polynomial may be a 32-degree polynomial, and hence, the shift register is a 32-bit long LFSR. For a maximal length polynomial, this leads to a code period of $2^{32}-1$. In other words, the PN bit pattern repeats every $2^{32}-1$ chips. The spreading rate is 250 Mega Chips Per Second (MCPS) leading to a code roll period of (($2^{32}-1$) Chips)/250 MCPS=17.17986918 seconds. Pilot Channels, whether on the Forward Link or on the Reverse Link, share the same structure, but differ in the selected spreading polynomial.

BOC Channel (BOC)

In an embodiment, the BOC ranging channel is designed purely for maximum accuracy in ranging purposes. The advantage of the BOC code is that it has more energy at higher frequency than the energy around the Data Channel. This result is sharper edge transitions, and hence, more accurate timing resolution, leading to more accurate distance measurements. One disadvantage of BOC is that the correlation results have more than one peak, leading to ambiguity in the central peak detection. Fortunately, in the system 100, the Pilot, Data, Acquisition, and BOC PNs are aligned, and the system 100 uses information from the Pilot and Data channels' timing to resolve the correlation peak ambiguity of the BOC channel. As mentioned before, the BOC channel may use BOC(0.5,1) relative to the Pilot spreading rate which has four correlation peaks.

Notably, the PN code of the BOC rolls over once for every two rolls of the Pilot PN code. Thus, the Pilot PN code rolls over every 17.17986918 seconds, whereas the BOC code rolls over every 34.35973836 seconds. Thus, after acquiring the Pilot Channel, there is an ambiguity as to whether the BOC code is in the first half of the code or the second half of the code. This may be resolved in one of two ways.

The first is to search for correlation energy in one of the two possible locations. The two-fold ambiguity is exactly ½ BOC PN roll apart, and hence, is orthogonal to the inherent ambiguity of a BOC channel having multiple adjacent peaks. Thus, once energy is found in one of the two locations, the Pilot timing allows the receiver to detect the BOC timing without any ambiguity.

The second way to resolve this two-fold ambiguity is to demodulate the Data Channel first. The Data Channel bit and frame boundary period is equal to the period of the BOC code. Hence, once the DC has been demodulated, the BOC timing will be known without any ambiguity.

In an embodiment, the BOC transmitted power level is lower when compared to that of the Pilot Channel. That is because the Pilot Channel is the primary ranging resource, while the BOC Channel is expected to be used only in demanding applications with higher available SNRs. The BOC channel may be BPSK modulated on the I baseband channel. Forward Link BOC Channels from all nodes may use the same polynomial for Forward Link BOC Channels, and a different polynomial for all the Reverse Link BOC Channels. The BOC transmission on the Reverse Link is optional.

The binary signals from each of the Pilot and the BOC channels may be separately scaled according to the desired power level, and then added together. The result can be used to modulate the I baseband channel in the I Q modulator of the ranging signal transmitter.

Acquisition Channel (AC)

In an embodiment, the Acquisition Channel uses a short 16-bit code, which is designed to facilitate fast acquisition of the system. When the RN 102 enters a vicinity, and assuming that there is no aiding information available from a server 120 or via Bluetooth™ or Wi-Fi™, the RN 102 attempts to acquire any Acquisition Channel that might be available. Exhaustive searching of 16-bit code using Fast Fourier Transform (FFT) techniques is well within the capability of modern electronics. Once an Acquisition Channel is acquired, the RN 102 uses this Acquisition Channel's recovered timing to narrow down the search window in looking for the associated Pilot Channel.

During operation, the Acquisition Channel is only needed when the RN 102 is acquiring the first SN 110 from a newly visited constellation with no outside assistance or a priori knowledge. Once one Acquisition Channel is detected, and subsequently the associated Pilot Channel and then the Data Channel are detected, the acquired SN 110 provides aiding information to speed up the RN's acquisition of the neighboring SNs 110. This neighbor information is sufficient to narrow the Pilot search window for the neighbors to a much tighter window than what the Acquisition Channel can provide. Hence, once one SN 110 from a constellation is acquired, the role of the Acquisition Channels diminishes. Therefore, the first, and possibly only necessary, Acquisition Channel comes from the closest SN 110, and therefore, would arrive with robust SNR. For this reason, the transmission power of the Acquisition Channel may be lower than the transmission power of the Data and Pilot Channels. The Acquisition Channel may be transmitted on the Q baseband channel along with the Data Channel.

The Acquisition Channel is not used in the Sporadic Reverse Link Mode (SRM), because the RN 102 in SRM that wants to use the Reverse Link has already acquired the constellation and already has a very good sense of the timing of all the SNs 110 in the constellation. However, in CRM, the Reverse Link does implement the Acquisition Channel.

AC Aided Acquisition

In an embodiment, to acquire a ranging signal from a cold start, the RN 102 uses an FFT technique to lock onto the first Acquisition Channel it can get. This FFT technique may search in both code and Doppler space. Once an Acquisition Channel is detected, the search window for the long code of the Pilot Channel drops from $2^{32}-1$ to $2^{16}+1$. Assuming enough SNR to correlate over only 65,535 chips (since the Acquisition Channel can be detected that way), and assuming that subsequent to AC acquisition only code space needs to be searched (since by now the Doppler shift has been resolved), the first Pilot acquisition may be obtained in less than one second, followed by the neighbor list and constellation acquisition in similar time. This is very acceptable for system acquisition from a cold start.

In an embodiment, once the Acquisition Channel is acquired, the searcher must search for the Pilot peak at one of the 65,537 hypotheses. Each PN offset hypothesis differs from the other hypotheses by exactly 65,535 Pilot PN Chips. For this reason, the searcher that is used to locate the Pilot timing must search the remaining 65,537 hypotheses, with each separated from the other by exactly 65,535 PN chips. This is different from the typical searcher for which the searching hypotheses are contiguous. Advantageously, the searcher hardware, in this embodiment of system 100, is able to support both modes of operation.

Data Channel (DC)

In an embodiment, the Data Channel uses a 32-bit LFSR to generate the code it uses. It may be spread at the primary spreading rate of 250 MCPS. Each bit of data spans $(2 \times 65535)=131070$ chips. This gives a processing gain of 51.2 dB. Notably, even though each bit is 131,070 chips long, the spreading code is still $2^{32}-1$ long. Hence the probability of data channel collisions among SNs 110 is fairly low. The Data Channels, whether on the Forward Link or on the Reverse Link, share the same structure, but differ in the selected spreading polynomial.

Data Channel Structure

In an embodiment, the data bits frames are aligned with the PN roll of the BOC. Since the PN roll of the BOC contains two PN rolls of the Pilot PN roll, the data channel frames are aligned with every even Pilot PN roll. There are exactly $(2\times(2^{32}-1))/131070=65537$ data bits in one code roll of the long BOC code. The last bit is always set to "0", leaving 65,536 bits for payload. These 65,536 bits are divided into 32 data frames. These data frames are labeled frames 0 through 31. The fields within each frame are different depending on the frame number. Each frame contains 2,048 bits. The period of a data frame is 1.07374182375 seconds or almost one per second. To improve data reception and protect data integrity, the frame bits are covered with a ¾ Forward Error Correction (FEC) code which uses a soft decision Viterbi decoder at the receiver. After FEC, $((2048\times3)/4)=1536$ bits remain to carry the data in the frame.

In an embodiment, block interleaving is used on the Data Channel to add robustness against burst errors. This is important in embodiments in which the ranging signals are transmitted at very low power, since they share the spectrum with users that transmit at much higher power levels. At times where one of these other spectrum users is transmitting, there is a chance that the ranging signals are completely masked. The ranging signals already have some robustness against these interferences because of the use of spread spectrum modulation with high processing gains. This is especially true for the Pilot, BOC, and Acquisition channels, since they do not have any data modulation on them. To improve data integrity in the face of possible burst errors caused by an interferer, the Data Channel may use block encoding to spread the effect of a burst error across the whole of a data frame so that they can be better handled by the FEC.

A 16-bit CRC code can be computed on the first 1,520 bits of the frame and appended to the end of the frame. Hence, at the transmitter, each frame has 1,520 bits of data payload. Once populated with the desired information, the transmitter then computes the 16-bit CRC code of these 1,520 payload bits and appends the 16-bit CRC to the end of the frame. The transmitter then block-interleaves these 1,536 bits. Finally, the transmitter covers these 1,536 bits with a ¾ FEC code, yielding the 2,048 bits that constitute the transmitted frame.

In an embodiment, the progression of decoding the Data Channel is to first acquire the Pilot Channel. Once the Pilot timing is acquired, the timing alignment of the Data Channel can be one of two possibilities. The receiver then tries decoding both possibilities. Notably, the wrong possibility has a wrong bit boundary and a wrong field boundary, and will fail the CRC check. Therefore, it is fairly easy to determine the correct option based on successful CRC computation on a given frame after decoding the data bits. Once the correct timing of the frames is determined, this also resolves the timing ambiguity between the BOC and the Pilot channels. The receiver is now able to decode the BOC Channel with full and complete knowledge of the BOC timing without any ambiguity.

Fast Changing and Slow Changing Fields

In an embodiment, the minimum information that needs to be encoded on the Data Channel, such that the RN 102 can determine its accurate location, without needing any additional information from a server 120 or BTLE or Wi-Fi™ Packets for UTDOA, includes:

The 6-byte MAC address that uniquely identifies each transmitting SN 110.

The physical location of each transmitting SN 110 relative to an agreed upon datum. Four bytes may be used for each X, Y, and Z, adding up to 12 bytes for each SN 110.

The time offset between each transmitting SN 110 and a number of its neighboring SNs 110. This is the PN offset, but with a time resolution equal to the accuracy of the system.

The parameters of the frequency drift model for the frequency drift of each transmitting SN 110 relative to its neighboring SNs 110.

The above list contains items that need to be updated quite frequently, as well as items whose values are fairly stationary. For example, the physical position of each SN 110 is not expected to change every second. The MAC address of each SN 110 is also not expected to change. Therefore, these information fields need not be present in every data frame. In contrast, because the nodes are not locked in frequency during normal operation, their time offset from each other may continuously and rapidly change. Each SN 110 models this information and only transmits the frequency drift model's parameters rather than the actual time or frequency offset. This enables the receiver to do forward prediction of the needed state without explicitly receiving the state estimate in each frame, thereby reducing the required data bandwidth.

Data Channel Processing Gains

In an embodiment, the transmission power of the Data Channel is equal to the transmission power of the Pilot Channel. For the Data Channel, the correlation period is over 131,070 chips. Hence, correlation over one bit period yields almost +53 dB of processing gain, including 1 dB from the FEC coding. Lower processing gain can be tolerated in the Data Channel, because it is decoded synchronously in tracking mode after the Pilot Channel has been acquired.

Spreading Polynomial Selection

In an embodiment, there are four polynomials that are used in the Forward Link, and four other polynomial that are used in the Reverse Link. Six of the eight polynomials are 32-bit polynomials, while the other two polynomials are 16-bit polynomials. At 16 bits, and much more at 32 bits, there is a large number of different maximal length LFSR polynomials to choose from. Maximal length polynomials have the best autocorrelation properties. However, random LFSR polynomials can have undesirable cross-correlation properties. To minimize this effect, the eight polynomials may be chosen to have the lowest (i.e. best) possible cross-correlation properties.

Acquisition vs. Tracking SNR

In normal receivers, the SNR needed for tracking is lower than that which is needed for acquisition of the signal. In the system 100, the acquisition of the ranging signal from one SN 110 greatly narrows the search window in both the PN offset and frequency offset, due to the aid that one SN 110 provides for a listening RN 102. Therefore, after acquiring one SN 110, acquiring the neighboring SNs 110 requires lower SNR and can be done by acquiring the Pilot Channel directly without needing to acquire the Acquisition Channel. This is a significant advantage, since the Acquisition Channel has lower power and shorter code with potentially lower processing gain and resulting SNR. Given any anticipated deployment, the RN 102 is always expected to be close to at least one SN 110. In other words, it is expected that the RN 102 would see at least on SN 110 with a robust SNR on that SN's Acquisition Channel. This RN 102 can then use the data from this SN 110 to detect the other SNs 110 by acquiring their Pilot and Data channels directly, despite the possibly lower SNR of their Data Channels. As shown, the system 100 fully utilizes the fact that tracking requires lower SNR than searching.

Multi Frequency Secondary Ranging Signal

In an embodiment, each SN 110 may optionally emit an additional ranging signal that is similar to the primary ranging signal (PRS), but at a different center carrier frequency. This additional ranging signal is called a secondary ranging signal (SRS). The SRS may use different polynomials to generate its PN sequences, or may use the same polynomials as the PRS since they are separated by different center carriers. As mentioned elsewhere herein in an implementation, the center carrier frequency for the PRS is 4.0 GHz. The SRS may be transmitted using a different carrier center frequency compared to the PRS but within 200-300 MHz of the PRS. For example, the center carrier for the SRS can be 3.750 GHz or 4.250 GHz.

In future implementations, much higher carrier frequencies can be used. At that time, multi-frequency operation becomes more useful in resolving the integer carrier cycle ambiguity when performing the very high accuracy carrier phase-based location determination.

Limiting Combined Ranging Signal Power Level to Below Background Thermal Noise

In an embodiment, one differentiator of the system 100 is that it limits transmit power to be below thermal noise. This allows the system 100 to use very wide bandwidth, across bands that are occupied and used by licensed operators. The system 100 may also cover its ranging signals with high spreading rate Direct Sequence Spread Spectrum. This guarantees that the ranging signals, as received by any receiver in the vicinity, are noise like in structure and are well below the natural thermal background noise in power. Hence, the system 100 can operate at any frequency and with little restriction on bandwidth without interfering with other users. All SN ranging signal emissions should remain below −70 dBm/MHz to comply with the most stringent global regulatory body regulations prohibiting interference with licensed uses of the occupied spectrum. Given a spreading rate of 250 MCPS, the combined transmit power for all the Pilot, BOC, Acquisition, and Data channels from one SN 110 should be kept below −50 dBm in the case of single frequency operations. In the case of multiple frequency operation, this might need to be de-rated further if the carrier frequencies of the PRS and the SRS are close enough for the main spreading lobes to closely overlap. The receivers (e.g., RNs 102, CNs 114, other SNs 110) may utilize spread spectrum processing gain to receive the ranging signals transmitted at the set transmit power.

In an alternative or additional embodiment, when the SNs 110 are operated in a protected exclusive frequency band, the transmit power of the ranging signals may be set to higher than background thermal noise. In this case, the receivers (e.g., RNs 102, CNs 114, other SNs 110) may utilize spread spectrum processing gain to improve the SNR. In some implementations, each SN 110 may be configured to adjust the transmit power of its ranging signal based on the frequency band in which it is operating.

Ranging Signal Power Control

In an embodiment comprising a management server 120, the RNs 102 may report, to the server 120, the power levels of each SN 110 it has acquired. In conditions in which one SN 110 is continuously being reported by all RNs 102 to be louder than all other SNs 110, the server 120 may instruct the loud SN 110 to lower the emitted ranging signal transmit power. The server 120 can use an optimization algorithm that attempts to have all the ranging signals from the SNs 110 arrive at the RNs 102 with power levels that are as close as possible. Notably, it is not possible to ensure that all RNs 102 receive the same power, since they can be at different distances from the SNs 110. However, the power control by the server 120 is designed to mitigate outliers.

Link Budget

In an embodiment, some assumptions are made to calculate the gain line up. For example, a line of sight attenuation model is assumed, since anything other than a line of sight signal is an undesired signal for ranging purposes. A 4 GHz center carrier, with an omni-directional antenna on one side of the link and a 3 dB gain reflector antenna on the other side of the link, may also be assumed. In addition, it is assumed that the transmitter and receiver can be from 1 meter apart to as much as 100 meters apart. At 4 GHz, the 1-meter free air path loss is −41.5 dB. For 100 meters, the path loss is about −81.5 dB. If transmission is at −47 dBm, the receiver will receive the signal at between −88.5 dBm and −128.5 dBm. Thermal noise at room temperature is estimated to be around −174 dBm/Hz. For just the main lobe of 500 MHz bandwidth, this amounts to −84 dBm. If the receiver is able to receive a wider bandwidth to include more side lobes, the SNR would be worse. Hence, for any receiver that is further than 1 meter away from an SN 110, an SN ranging signal is below thermal noise at the input of such receiver, and hence, should not interfere with the operation of such receiver. The system 100 may rely heavily on processing gains to pull the signal out of the noise floor.

For indoor automation, it is assumed that an update rate of 100 times per second is sufficient for most applications. With a 250 MCPS chipping rate and a 10 ms update rate, there would be enough time to correlate 2.5 million chips for every update. This gives a processing gain of +64 dB, which is enough for robust detection of a −128.5 dBm signal. Under favorable conditions, the typical signal path loss is around −60 dB. At this typical condition, the received signal within the RN 102 from an SN 110 would be at −110 dBm. A processing gain of +64 dB may not be needed under such conditions. The correlation length can then be reduced, leading to an increased update rate. This can be important during initial acquisition of SN signals during an RN cold start.

Ranging Signal ON/OFF Cycling

In an embodiment of the system 100, the ranging signal emitted from the SN 110 is cycled on and of periodically. This may be done for two reasons:
  Allow each SN 110 to receive ranging signals from neighboring SNs 110.
  Mitigate the Near/Far Problem.

Notably, all of the PN generators that are modulating both the Pilot, BOC, Acquisition, and Data channels are not suspended during the transmit off time. In other words, the PN generators continue to run at their normal pace, regardless of the output state of the transmitter.

Receiving Neighboring SN Ranging Signals

In an embodiment of system 100, each SN 110 must detect the ranging signals from all neighboring SNs 110 in order to measure and broadcast the time and frequency offsets to a listening RN 102. However, given that all SNs 110 transmit on the same frequency and given that the transmit signal from one SN 110 is strong enough to block signals from all other SNs 110, the SN's receiver could be blocked by the power of the SN's own transmitted ranging signal. While CDMA allows for separation of same frequency signals using PN offsets, the power difference between the transmitted signals and the received signals at the antenna of the SN 110 can be higher than the achievable processing gain. A solution to this is to cycle the transmitter ON and OFF. For the Pilot Channel, the long code period can be chosen to be long enough so as to appear as truly random. Under this condition, even if the transmission is blocked 50% of the time, the effect will only be a −3 dB impact on the SNR at the receiver. When the transmitter of the SN 110 is OFF, the receiver of that SN 110 can now listen to all of the neighboring SNs 110 without having to waste most of the processing power or ADC dynamic range to combat its own transmitting signal.

Because the system 100 does not have any notion of a master scheduler in an embodiment, each SN 110 may randomly choose the times to cycle the transmitter ON or OFF, as long as the average duty cycle is 50%. This can be done fixing the ON time $t_{on}$ to be a fraction of the period of the shortest possible integration period, and then randomly choosing the OFF time from 0 to $2t_{on}$. This can be done on a cycle-by-cycle time basis. The tradeoff governing the ON time is to make it long enough so that the guard time switching overhead becomes insignificant compared to the ON time, but also short enough to occur at least 10 times within the shortest correlation period at the receiver. Also, the random nature of the timing ensures that there is no relationship among the ON-OFF timing of the SNs 110.

This cycling of the transmitter of each SN 110 affects the different channels within the ranging signal differently. The Acquisition Channel dictates the minimum length of the OFF period, because the Acquisition Channel has the shortest PN code period. Within the Data Channel, each bit spans 131,070 chips which is longer than the AC code period of 65,535. The Pilot and the BOC channels' code period is much longer. If the minimum requirement of the Acquisition Channel is satisfied, all requirements from the other channels will be satisfied as well. Hence, if the longest ON-OFF cycling period allows for at least 10 cycles within the AC PN code roll period, all else would be fine. The shortest is limited by the overhead of switching the Radio Frequency (RF) transmission (TX) chain. This ensures that the impact on the data channel is only 3 dB, ignoring the effects of negligible switching time overhead without dropping the Acquisition Channel or dropping data bits.

Notably, this Tx ON-OFF cycling results in an average of −6 dB SNR loss for SNs 110. However, the RNs 102 and CNs 114 that are not using the Reverse Link only suffer an average of −3 dB SNR loss.

Benign Interference of Tx Cycling

In the days of GSM cellular systems, this ON-OFF hard cycling of the transmitter was picked up by nearby radios and TV receivers. More importantly, they were picked up by hearing aids, and presented undesirable tones to the users of such devices. In an embodiment, the system 100 does not generate such problems due to the very low power at which the SNs 110 transmit. For example, the ratio between GSM maximum output power and output power of the SNs 110 of the system 100 is more than 80 dB less in power, is spread over a much wider bandwidth, and is buried below thermal noise.

Mitigating the Near/Far Problem

In an embodiment, it is expected that the RN 102 could be much closer to one SN 110 than other SNs 110. The signal from the close SN 110 might be as much as 60 dB stronger than signals from much further SNs 110, assuming a 100-meter SN range. The stronger SN signal would effectively block the signals of other SNs 110 at the RN 102. However, during the time that this close SN 110 has its transmitter turned OFF, the signals from farther away SNs 110 are no longer blocked. This is another advantage of having each SN 110 periodically cycle its ranging signal transmitter.

SN Relative Frequency Offset Measurement and Tracking

As mentioned above, there is a preference, but not a need, to frequency lock all of the SNs 110 in a constellation. While locking frequency is a best-effort requirement, measuring the mutual frequency offsets among SNs 110 is a minimum requirement.

Broadcasting Local Frequency Reference Operational Offset

Each SN 110 can have a reference oscillator that it uses to generate the ranging signal upon power up. Each SN 110 may also include, in its Data Channel, any corrections that have been applied to the frequency of this reference oscillator before using it in the system 100. For example, the SN 110 may want to increase the operating frequency by 0.1 PPM compared to this reference oscillator. This means that the carrier frequencies, sampling clock, PN generator, and all other clocks in the SN 110 run faster by 0.1 PPM when compared to running straight from the reference oscillator. The SN 110 indicates that it is applying this offset to its local reference oscillator when generating its operational frequencies. Another SN 110, listening to the carrier frequency of this transmitting SN 110 and reading the applied local offset that is broadcast on the transmitting SN's Data Channel, is able to calculate the frequency offset between its own reference oscillator and the reference oscillator of the transmitting SN 110. The listening SN then slowly applies offsets to its own reference oscillator signal in order to bring its frequency of operation to the median of the reference oscillators of all the SNs 110 within its constellation.

Notably, the SNs 110 adjust their frequency of operation to equal the median frequency of the reference oscillators in each SN 110, and not the median of the operating frequencies of the SNs 110 it sees. This is important, because it is desired that the SNs 110 converge on an operating frequency that is the median of the frequencies of all of their reference oscillators. That means that the constellation will drive itself to the median of all of the crystal oscillators in the constellation, which is a relatively constant physical quantity. The system 100 would be unstable if the SNs 110 were to, instead, attempt to lock to the median of the operational frequencies of the SNs 110. In summary, the SNs 110 drift their operational frequency slowly toward the median of the frequency of their crystal oscillators and not the median of their operational frequency. This is the reason that each SN 110 broadcasts the difference between its reference oscillator and its apparent operational frequency.

It should be understood that all references above to a crystal oscillator are to the static crystal oscillator that is the local reference oscillator in the SN 110. This is different from the Voltage-Controlled Crystal Oscillator (VXCO) used to change the operation of the system 100.

Hunting the Median

As an example, assume two SNs 110, named SN1 and SN2. SN1 acquires the signal of SN2 and estimates the frequency offset of SN2 in the process. SN1 also receives the reported frequency offset between SN2's RF signals and SN2's local reference oscillator. SN1 uses this information to compute the frequency offset between its own reference oscillator and the reference oscillator of SN2. In the meantime, SN2 does the same. SN1 then slowly slews its frequency of operation to the median of all the reference oscillator offsets from all the other SNs 110 it sees. It is important that this slewing is done very slowly (e.g., on the order of tens of second) so as not to interfere with the RN frequency offset model of the SNs' mutual time drift. Notably, the slewing happens on the order of tens of seconds, because this is the time that is needed to settle to less than a fraction of a PPM. Assuming a reference oscillator of 25 MHz and a VCXO of 100 MHz, attempting to lock to measure the offset to better than 10 Parts Per Billion (PPB), will have a maximum update rate of once a second.

Notably, the frequency comparing counters within the field-programmable gate array (FPGA) need to run continuously and not be reset at the end of every measurement. This ensures that less-than-one-clock-cycle frequency offsets do eventually accumulate to one cycle and could be measured.

Utilization of SN Frequency Tracking

While it is not necessary for SNs 110 within a constellation to have all of reference oscillators locked to the same reference, having SNs 110 within the same constellation be as close as possible to each other in terms of their reference frequencies leads to two optimizations:

Speeding up of an RN's acquisition of the SNs 110 within a constellation.

Reducing the probability that one SN 110 needs to jump its PN generator.

Speeding Up Acquisition

If all SNs 110 within a constellation are close with respect to their reference frequencies, all SNs 110 would be acquired with the same frequency search bin at the receiver. This speeds up acquisition and/or reduces the required hardware at the receiver.

Reduce Necessary PN Code Jumps

Since the SNs 110 in a constellation have varying reference frequencies and it cannot be assumed that their frequencies are locked, their PN code offset relationships relative to each other are not static. At a 1-ppm difference between two SNs 110, the PN relative position can drift by as much as 250 Chips in one second given a spreading rate of 250 MCPS. Notably, signals from various SNs 110 may be distinguished from each other through their differing PN offsets. This is because all SNs 110 use the same spreading polynomial. This design was chosen because it simplifies installation by a layman. Using the same polynomials, the system 100 should guarantee that, at any receiver, signals from differing SNs 110 arrive with different apparent PN offsets. Since without frequency lock all SN PN codes are drifting relative to each other, the possibility of collision on the Acquisition Channel is not negligible. However, while collisions on the Acquisition channel are not negligible, they are benign. Fortunately, PN collisions on the Pilot, BOC, and Data channels, while possible, are very improbable.

Consider two SNs 110. One SN 110 is closer to the RN 102 and the other is farther from this RN 102. The closer SN 110 is about 1 meter away from the RN 102, while the farther SN is as far as 100 meters away from the RN 102. This gives a 99-meters worst case scenario between the closer SN 110 and the farther SN 110. At 250 MCPS, each chip is 4 ns or about 1.2 meters long, given the speed of light in free air. The closer SN 110 is a fraction of a chip away while the farther SN is a little over 83.4 chips away, leading to a difference of 83 chips. Hence, as long as the PN offset is more than this minimum, the RN 102 should be able to distinguish among SNs 110 that are 100 meters apart. The system 100 may be designed to ensure that SNs 110 maintain at least 128 chips apparent PN offset separations amongst each other. An SN 110 that powers up randomly chooses a startup PN offset. Recall that the long code is 4,294,967,295 chips long. If all SNs 110 within a constellation pick their PN offsets at random, and if there are twenty SNs 110 in a visible constellation with relatively equally received power, the probability of collision on the Ranging Channel is an insignificant 1 in 2.5 million as shown earlier. However, the short code used by the Acquisition Channel is only 65,535 chips long. The probability of collision is about 1 in 50. In addition, given that the SNs 110 are sliding relative to each other by as much as 250 chips per second due to operational frequency offsets, collisions among the Acquisition Channels of SNs 110 are inevitable and are likely. However, they are benign. Nevertheless, the system 100 may be designed to detect and prevent collision on the long code as unlikely as they may be.

An SN 110 continuously monitors the PN offsets of other SNs 110 it sees in the constellation. By examining the PN offsets and the chip drift rates relative to other SNs 110, the SN 110 can estimate the time in the future where the two PN offsets would come within 128 chips of each other. Prior to that occurring, the SN performs a code jump. This is a code jump that is 128 chips in the direction that is opposite to the direction of the drift. The SN 110 can broadcast on the Data Channel, and on the BTLE Pilot Channel or Wi-Fi™ packets if available, the time it intends to perform the jump and in which direction. Listening SNs 110 and RNs 102 become aware of this upcoming event and they jump the code that they are using in the tracker of the jumping SN 110 by the reported 128 chip jump. They do it at the exact chip boundary as specified by the jumping SN 110, which should line up with a Data Channel data frame boundary. Since this correction is done synchronously in all receivers, no correlation is affected, and the jump is transparent to a tracking receiver. When the SN 110 jumps, it also adjusts the relative PN offset measurements of other SNs 110 that it is broadcasting on its Data Channel.

In an embodiment, the code jump is performed simultaneously on all of the Pilot, BOC, AC, and Data channels. Since the jump of 128 chips is much less than the period of one bit in the Data Channel, the impact on the encoded Data Channel is insignificant. Code jumps occur coincident with the beginning of a data frame, and hence, there is an opportunity for a PN jump once every second.

Whenever an SN 110 carries out a code jump, it can throw off the RN 102 that is searching for it. However, since the SN 110 can only jump a maximum of one time each second and since the searcher correlation times are over a single short code period, the effect of the jump is to corrupt 1 out of 500 search results. This is negligible. Furthermore, a searcher not finding this particular SN 110 in a given search will find all other nearby SNs 110, and will start to track their Data Channels. From the information provided on the Data Channels of the SNs 110 it sees, the searcher will be in a position to acquire the SN 110 that was missed in those 1 out of 500 searches.

Different PN Codes Among SNs

In commercial installations, different polynomials can be used to optimize the deployment of the constellation of SNs 110.

SN Clock Offset Measurements

In an embodiment, each SN 110 measures the PN offset between itself and the signal received from another SN 110 using code phase. This measurement has two components in it. The first component is the actual PN offset if the two SNs 110 were coincident, i.e. at the same exact physical location. The second component is the free air delay from one SN 110 to the other due to the fact that they are physically separated. Free air delay appears as a positive delay at both ends. The PN offset perceived by a first SN 110 ("SN1"), relative to a second SN 110 ("SN2"), has a difference sign when it is perceived by SN2 relative to SN1. SN1 and SN2 broadcast these measurements on their Data Channels (e.g., in BTLE Packets) and, in embodiments which comprise a server 120, report them to the server 120. Subtracting these symmetric prospective measurements cancels out the free air delay, resulting in a measurement of the true PN offset as if the two nodes were physically coincident. It is assumed that the RF channel between SN1 and SN2 is symmetrical given the simultaneity of the measurements. In an embodiment, the SNs 110 only report the apparent time differences they measure on their Data Channel, but do not attempt to correct for it or synchronize to each other. The subtraction is actually done within the RN 102 via UTDOA.

In addition to the PN offset and the free air delay between two nodes, the measurements mentioned above may also contain the RF Tx and Rx hardware delays. This is because the Rx section in any SN 110 is always listening to its own transmitted ranging signal from its Tx section when the Tx section is transmitting. Hence, loopback measurements of these delays are continuously performed, and compensation is performed for the measured delays.

SN Carrier Phase Synchronization

In an embodiment, during manufacturing, the carrier phase of each SN 110 is calibrated so that the zero crossings of the carrier lines up with the code transition times. This is possible because the carrier frequencies of ranging signals are always an integer multiple of the PN code chipping rate. At the transmitter of the SN 110, the ranging signal is transmitted using only the I component of a quadrature upconverter. At the receiver of another SN 110, the detected carrier phase is a function of the free air delay due the physical separation and also due to the phase offset between the local oscillators of the two SNs 110. Similar to the situation with the code phase time difference measurements, each SN 110 reports the measured carrier phase of the other SNs 110 it sees, on its Data Channel. The phase offset due to free air propagation has the same sign on both sides, whereas the carrier phase offset due to the local oscillator (LO) offsets has opposite signs. By subtracting the two measurements, the carrier phase offsets can be determined among all of the LOs of all of the SNs 110 in a constellation. Compensation for these LO phase offsets is performed at the RN 102.

Similar to the discussion in the previous section, the loopback carrier phase offset from the Tx section to the Rx section are continuously performed, and compensation is performed as needed in the localization and timing equations.

Resolving Carrier Integer Ambiguity within the RN

RNs 102 can use the received phase of the 4 GHz carrier of the ranging signal to calculate a much more accurate position than when relying only on code phase. Unlike the code, the carrier is periodic. The RN receiver has a good estimate of the carrier phase it is detecting from each SN 110, but in order to produce a pseudo range, the RN 102 needs to resolve the integer number of carrier cycles in addition to the residual phase it is measuring. In GPS, this is done either through external assistance or through dwelling in the same location for tens of minutes while the geometry of the satellites evolves enough to resolve the integer ambiguity. In the system 100, the spreading rate at 250 MCPS is only sixteen time less than the carrier frequency of 4 GHz. Under good SNR, interpolation within the code by a factor of one hundred is feasible. This instantly resolves the integer carrier ambiguity, enabling instant carrier phase measurements and enabling carrier phase millimeter accuracy. The employed spreading rate in the system 100 allows for direct resolution of the integer carrier cycle ambiguity up to a carrier frequency in the range of 25 GHz.

System Acquisition

In an embodiment, there are multiple modes for system acquisition of a constellation of SNs 110 by the RN 102 for position determination. The modes below could each be used alone or in combinations with the other modes:
  Using Acquisition Channel short code.
  Using Acquisition Channel short code with the server 120.
  Using BTLE Packets.
  Using BTLE Packets with the server 120.

Acquisition Using the Acquisition Channel Short Code and without a Server

This is the dominant mode of operation of the system. It requires the RN 102 to acquire the ranging signals and demodulate the Data Channel. In this mode, the RN 102 continuously searches for the SN's short code used in the Acquisition Channel. It continuously tests all possible frequency and code offsets. This is feasible given the relatively short period of the Data Channel code when compared to the Ranging Channel long code. The code offset search space is the period of the code of $2^{16}-1$, and the frequency bins are twenty bins of 600 Hz each for a range of +/-6 KHz. The exhaustive code search is done using FFT techniques. The input data is transformed using FFT. The FFT of twenty rotated code cycles are then dot multiplied with the input FFT result. The Inverse FFT of these twenty vectors are then calculated, and the peaks are found. Calculations show that this could be done either in the FPGA or using one of the two Advanced Reduced Instruction Set Computer (RISC) Machines (ARM) processor cores within the FPGA. The advantage of this approach is that once the full calculation is performed, all of the visible SNs 110 are detected at once.

Once the Acquisition Channel has been acquired, the RN 102 then searches for the timing of the Pilot Channel. With the Acquisition Channel acquired, the Pilot timing can be at one of $2^{16}-1=65535$ possibilities. These remaining PN offset possibilities are separated from each other by $2^{16}-1$ chips. An integration time over $2^{16}-1$ chips at 250 MCPS takes about 262 microseconds to perform. A parallel searcher that can search 32 PN chip position possibilities in parallel will be able to acquire the Pilot timing in a little over 0.53 seconds.

Once the Pilot Channel timing is determined, the timing of the Data and BOC channels can have one of only two possibilities. The RN 102 may decode the Data Channel and recover the Data Frame for these two possibilities. The correct one will result in a correct cyclic redundancy check (CRC), and that will indicate the correct timing of both the BOC Channel and the Data Channel. The BOC Channel can then be optionally acquired if there is sufficient available SNR and when the higher BOC accuracy is desired.

There are a few optimizations that can occur at this point. Instead of waiting to acquire all of the Acquisition Channels from all of the SNs 110, there is enough information in the Data Channel of one SN 110 to assist in acquiring the long code of a neighboring SN 110. The RN 102 can use this information as soon as it is available, rather than wait for all of the Acquisition Channels of the other SNs 110 to be modulated. This is a key advantage, because the Acquisition Channel has much lower processing gain and signal power than the Pilot and Data channels. By making one acquired SN 110 provide enough data and timing to acquire all the neighboring SNs 110 without using their Acquisition Channels increases system availability.

Acquisition Using the Acquisition Channel Short Code and with Server Aiding

This mode is the same as the above but with the addition of an aiding server 120. Once the RN 102 acquires the Acquisition Channel of one SN 110 within a constellation, the server 120 can provide the RN 102 with aiding information that assists in faster capture of the long codes of all of the SNs 110 within a constellation without the need to decode the Data Channels of the SN 110 to get the required information. Basically, the RN 102 only acquires the Pilot Channels of each SN 110 using the server aiding information, and does not need to decode the Data Channels of the SNs 110, since the server 120 is providing the needed information (e.g., using Wi-Fi™).

In this mode, the SNs 110 continually update the server 120 with their timing and frequency measurements, for example, using an available Wi-Fi™ network or other wireless network. The Wi-Fi™ network has much higher data rates and higher SNRs than the Data Channels of the SNs 110 and can allow much faster updates and information delivery from SNs 110 to the server 120 and from the server 120 to the RNs 102.

In this mode, it is optional to demodulate the Data Channels of the acquired SNs 110. However, this may be necessary if the RN 102 needs to utilize the BOC Channel, as demanded by the application.

Bluetooth™-Initiated Server-Assisted Acquisition

In this mode, the RN 102 looks for BTLE Packets. If it detects a BTLE Packet, the RN 102 knows the timing of the wideband Pilot Channel of the SN 110 from which this BTLE packet arrived, down to a few chips, and can quickly acquire the Pilot Channel within one search. The RN 102 communicates the MAC address of the detected BTLE Packet to the server 120. The server 120 responds with the neighbor list of SNs 110 containing their relative PN offsets and their frequency offsets relative to other SNs 110. The RN 102 uses this data to lock to the Pilot Channels of all of the other SNs 110. The server 120 may also convey the frequency offset of this SN 110 from the GPS frequency reference when available. Providing the SN state relative to GPS is useful for RNs 102 that already have a good sense of GPS timing. Using the aiding information, these RNs 102 can acquire the SNs 110 much faster, due to these RNs' good knowledge of GPS time and using the offset from GPS time provided by the SNs 110.

The RN 102 uses this server information to acquire the long code of the Pilot Channels of all SNs 110 on the neighbor list. The neighbor list contains all the SNs 110 that the server 120 knows to be neighboring the SN 110 with the reported MAC address from the RN 102. After acquiring the long code Pilot Channel, the RN 102 optionally starts demodulating the accompanying Data Channel from each SN 110. At this point, the RN 102 starts to track the Pilot Channel of each SN 110. Once the RN 102 tracks four SNs 110, the RN 102 can calculate and continually update its location (e.g., to server 120).

In a server-managed system, the SNs 110 may continually update the server 120 with their information using a local Wi-Fi™ network. The most frequent updates involve reporting measured time and frequency offset between a given SN 110 and its neighboring SNs 110. This is an insignificant traffic burden on a modern Wi-Fi™ network.

In this mode, it is optional for the RN 102 to demodulate the Data Channels of the acquired SNs 110. However, this may be necessary if the RN 102 needs to utilize the BOC Channel, as demanded by the application.

Bluetooth-Assisted without Server Aiding Acquisition

In this mode the RN 102 looks for BTLE Packets. When it detects one BTLE Packet, the RN 102 uses the timing and information of this BTLE Packet to acquire the ranging signal of this SN 110 and the reported neighboring SNs 110. The RN 102 then starts to demodulate the Data Channel of each SN 110. At this point, the RN 102 can track and calculate its position based on the timing of the Pilot Channel and the information contained in the Data Channel.

Ranging Using BILE-Only Operation

In this mode the RN 102 does not have the capability or the need to acquire either the wide-band ranging channels, nor the Data Channels of the SNs 110. The RN 102 here only has a Bluetooth™ modem with tight timing. In this mode, the RN 102 listens for the BTLE Pilots. If it is able to see BTLE Packets from five separate SNs 110, it can calculate a robust position. The RN 102 continues to listen to the SNs 110 and continually improves its estimate of the frequency offsets between itself and the constellation of SNs 110 sending the BTLE Packets.

It is possible at some point that the RN 102 may get a good enough estimate of the frequency offset that it can compensate for it. This would allow the RN 102 to determine its location using the BTLE Packets from only four SNs 110, since the fifth variable of rate of time drift between BTLE Packet measurements is now known by the RN 102 to the desired accuracy.

Ranging Using Wi-Fi™-Only Operation

This mode is very similar to using only BTLE Advertising Packets described above, except that 802.11 Wi-Fi™-compliant packets are used instead of BTLE Packets. In both cases, the timing of these packets, relative to the timing of the wideband Pilot Channel when transmitted from the SN 110, is tightly controlled and is carried in the payload of these packets or delivered from a server to the RNs 110.

Including IMU's in Roaming Nodes

A Roaming Node (RN) 102, operating with forward-link-only ranging, does not emit a ranging signal and hence has no need for a broadband transmit chain. The RN 102 has a more stringent broadband requirement on the receive chain to combat multi-path signals. Otherwise, the RN 102 shares the same hardware requirements as the SN 110. In an embodiment, an RN 102 uses Inertial Measurement Units (IMUs) to improve positioning accuracy through Kalman filtering. Hence, the sparse Gaussian processes (SGP) may utilize a triple-axis accelerometer, a triple-axis gyroscope, and/or a triple-axis magneto sensor. The usage of IMUs by the RNs 102 and CNs 114 improves system accuracy.

System Calibration Using Calibration Nodes

After placement of the SNs 110, their positions should be calibrated. A Calibration Node (CN) 114 can be used to perform this function. Positional calibration involves determining the physical location of the installed SNs 110. The position is determined relative to a chosen datum. For simplicity here, it is assumed that the datum in a room is the upper left point of the entrance door frame when viewing the door from inside the room. However, other datums can be chosen. The CN 114 is a composite node consisting of four or more nodes that lie within a plane, are not co-linear, and are spatially separated from each other in a mechanically rigid way. Their physical relationship to each other is fixed and known. For example, the four nodes could be attached to a rigid sheet of nonconductive material with their relative positions determined during manufacturing. This sheet is hung on the entrance door. When hung, a known physical relationship is easily established between the nodes and the upper left corner of the door. This establishes a relationship between the room datum (e.g., the upper left corner of the door) and each of the nodes. Each node then acquires the Pilot and BOC channels of each SN 110 in the room. Because there are four nodes in the CN 114, the location of each SN 110 is uniquely identified by the measurements of the ranging signal from that SN 110 when received by the four nodes in the CN 114. Since the nodes are planar, there is two-option ambiguity as to the position of each SN 110. This is resolved immediately as the door is swung.

Thus, a general calibration procedure is to place the composite CN 114 correctly relative to the chosen datum and then to move this CN 114 a bit. This immediately determines the location of all the visible SNs 110 in the room. Once the position of a number of SNs 110 is accurately determined, an RN 102 can simply be walked through the premises. This will automatically calibrate more and more of the installed SNs 110 as the RN 102 roams throughout the building. After that, the system 100 can continually improve the calibration of the SNs 110 as more RNs 102 roam the building under normal usage.

Absolute Time (LPXT)

Using UTDOA, the system 100 does not need a sense of absolute time or a time standard for it to provide accurate position location. However, the system 100 can implement a type of absolute time, referred to herein as LPX time or LPXT, as an additional feature. Under certain conditions, knowledge of LPXT can speed up system acquisition by RNs 102.

The time reference for the system 100 can be defined as starting on the first clock second of an arbitrary reference date (e.g., Apr. 7, 2019) as defined by GPS Time. Using military time notation, LPXT will start when the hours, minutes, and seconds read 00:00:00 on the reference date. At this instant, the long PN of the ranging signal would roll from an all ones state to a next state. The LPXT is kept by counting the PN rolls of the long PN code since the start time on the reference date. Notably, the GPS time differs from Coordinated Universal Time (UTC) by the number of seconds that UTC retards once in a while to correct for the slowing of the rotation of the earth. GPS does not apply these corrections and, in an embodiment, nor does LPXT. For example, GPS time differs from UTC by 18 seconds in 2019, and so would LPXT. The SNs 110 may broadcast this difference when available.

In an embodiment, Apr. 7, 2019 is chosen as the reference date. In GPS time, the time is reported by the second of the week and the number of weeks that have elapsed since the GPS start time on Jan. 6, 1980. However, GPS only uses ten bits to report the week count. Therefore, the week count in GPS rolls over every 19.6 years. On midnight of Saturday, Apr. 6, 2019, the GPS week count rolled over and started a new count on the first second of Apr. 7, 2019. Having LPXT start at this rollover time eliminates the need for additional conversion steps, while using a contemporary date.

Using LPXT for Faster Acquisition

In an embodiment, whenever available, the SN 110 will calculate the time difference between its internal clock and LPXT, and will report this time difference in its Data Channel. This can aid system acquisition by the RN 102 which has a good sense of GPS or LPXT. However, providing this information is optional since not every SN 110 or even a constellation of SNs 110 might have this information available to them.

In the presence of a server 120 that knows the difference between the constellation's absolute time and GPS time, an RN 102 coming from outside the indoor environment 106 with a good sense of GPS time and receiving aiding information from the server 120 can directly lock onto the Pilot Channels of all nearby SNs 110 without needing to use their Acquisition or Data channels. This is possible whenever there is at least one SN 110 within a constellation that has a GPS receiver and visibility to the outside sky. Such an SN 110 can provide the measurement of the difference of constellation time and GPS time to the server 120, thereby facilitating much faster acquisition by RNs 102 with a good sense of GPS time from either having a GPS receiver or by being locked to the timing of a cellular communications network with RF carriers and signal timing that is GPS derived.

Using LPXT for Providing Location Corrected Absolute Time

In addition to aiding in acquisition, the use of LPXT in the SNs 110 allows receivers to set their clocks in a manner that is independent of location, since the LPXT time reported by the SN 110 is already corrected for the propagation time of the signal from the GPS-locked reference within a constellation.

Example Processes

FIG. 2 illustrates an example process that may be executed by each SN 110, according to an embodiment. In step 210, the SN 110 transmits a ranging signal. In step 220, the SN 110 receives a ranging signal from each of one or more neighboring SNs. In step 230, the SN 110 calculates an offset (e.g., time offset and frequency offset) between its ranging signal and the received ranging signal(s) from the neighboring SN(s). In step 240, the SN 110 incorporates the calculated offset into its ranging signal.

FIG. 3 illustrates an example process that may be executed by each RN 102, according to an embodiment. In step 310, the RN 102 receives ranging signals from a plurality of SNs 110. In step 320, the RN 102 calculates its location (e.g., three-dimensional position) within indoor environment 106 based on the UTDOA of the received ranging signals.

Using a Measuring Node to Report Offsets

As described above, the system 100 may comprise SNs 110 that do not synchronize in time or frequency to other nearby SNs 110 to implement UTDOA. Each SN 110 continuously listens to ranging signals from nearby SNs 110, and uses this information to measure time and frequency errors between itself and each detected SN 110. The SN 110 then broadcasts these offset estimates to any RN 102 in the vicinity, for example, in the form of coefficients of a forward predicting modeling equation.

In an alternative embodiment, the system 100 may comprise a Measuring Node (MN) 118. For example, each constellation of SNs 110 may comprise a single MN 118. The MN 118 may be placed in or near the middle of the indoor environment 106, such that the MN 118 can detect signals from all SNs 110 in the indoor environment 106. For example, a convenient location would be in a smoke alarm or a lighting trim within the indoor environment 106. The MN 118 knows its location relative to the SNs 110, and, similarly or identically to the SNs 110 in the previously described embodiments, is able to estimate the frequency and timing offsets of all of the SNs 110 it sees. The MN 118 then broadcasts these offsets (e.g., as parameters of a forward predicting modeling equation) to RNs 102, as well as SNs 110, in the indoor environment 106. Using this information, a listening RN 102 can compute its location using the previously described UTDOA method. In addition, the data broadcast from the MN 118 is received by the SNs 110 and is broadcast on those SNs' ranging signals.

Using an MN 118, the SNs 110 no longer need to measure the offsets of their neighboring SNs 110 themselves. The SNs 110 can simply relay this information to RNs 102 using BTLE Packets or Wi-Fi™ Packets, as described elsewhere herein. Thus, the SNs 110 may consist of a ranging signal receiver and transmitter and a BTLE or a Wi-Fi™ module. Not only does this lower the cost of the SNs 110 (e.g., because the SNs 110 do not need to have the processing resources to measure offsets), but it also lowers the power consumption of an SN 110, such that battery operation for many months or years becomes feasible, thereby simplifying installation (e.g., since battery operation eliminates the need for an electrical backbone).

FIG. 4A illustrates an example process that may be executed by an MN 118, according to an embodiment. In step 410, the MN 118 receives ranging signals from all of the SNs 110 in a constellation. In step 420, the MN 118 calculates offset(s) (e.g., time offset and frequency offset) between the received ranging signals for all of the SNs 110 in the constellation. In step 430, the MN 118 broadcasts the calculated offsets within the indoor environment 106.

FIG. 4B illustrates an example process that may be executed by each SN 110 in a constellation with an MN 118, according to an embodiment. In step 450, the SN 110 receives the offsets broadcast by the MN 118. In step 460, the SN 110 transmits a ranging signal that includes the received offsets.

Example Processing Device

Figure 5:
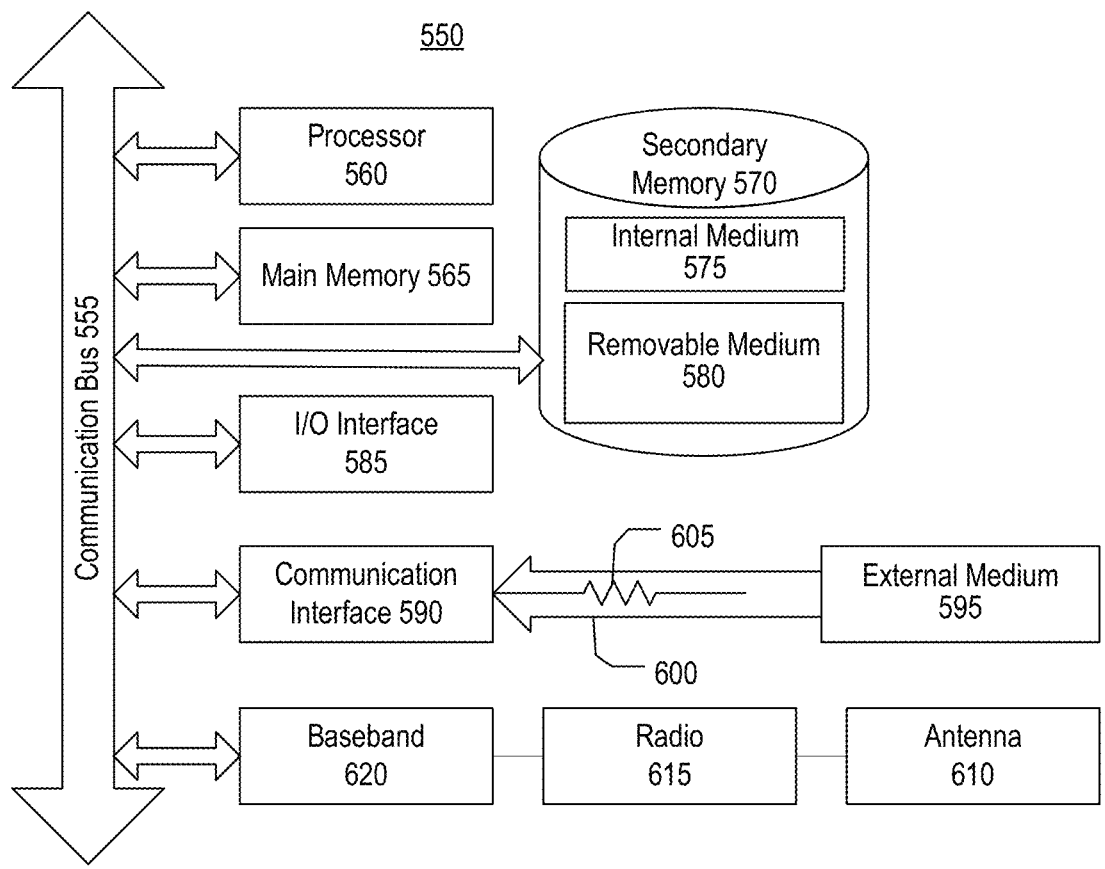
FIG. 5 illustrates an example processing system, by which one or more of the processes described herein, may be executed, according to an embodiment.

FIG. 5 is a functional block diagram of a device for performing methods associated with the system 100 of FIG. 1. For example, a system 550 can be used as or in conjunction with one or more of the RN 102, the SNs 110, and the server 120, other user devices, computers, or equivalent platforms, devices, or processes of the methods and various communications described above. The system 550 can be a server (e.g., the server 120), a mobile device (e.g., the RN 102 or CN 114), a transmitter or transceiver device (e.g., the SNs 110), any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Other Aspects

References throughout this specification to "one embodiment," "an embodiment," "some embodiments," and the like mean that a particular feature, structure, or characteristic described in connection with the embodiment is included in at least one embodiment. Thus, appearances of these phrases throughout this specification are not necessarily all referring to the same embodiment. Furthermore, the particular features, structures, or characteristics may be combined in any suitable manner in one or more embodiments.

The foregoing method descriptions and the process flow diagrams are provided merely as illustrative examples and are not intended to require or imply that the operations of the various embodiments must be performed in the order presented. As will be appreciated by one of skill in the art, the order of operations in the foregoing embodiments may be performed in any order. Words such as "thereafter," "then," "next," and the like are not intended to limit the order of the operations. Rather, these words are simply used to guide the reader through the description of the methods. Further, any reference to claim elements in the singular, for example, using the articles "a," "an," or "the," is not to be construed as limiting the element to the singular.

The hardware used to implement the various methods, systems, blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, for example, a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Furthermore, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system enabling location determination within an indoor environment, the system comprising:
   a plurality of stationary nodes to be arranged as a constellation within the indoor environment, wherein each of the plurality of stationary nodes is configured to transmit a ranging signal,
   receive ranging signals transmitted by one or more neighboring ones of the plurality of stationary nodes,
   calculate an offset between the ranging signal that the stationary node transmits and the ranging signals received from the one or more neighboring stationary nodes, and
   include the offset in the ranging signal that the stationary node transmits;
   wherein each of one or more of the plurality of stationary nodes is housed within a containing device that provides a function other than location determination.

2. The system of claim 1, wherein none of the plurality of stationary nodes synchronize with each other.

3. The system of claim 1, wherein none of the plurality of stationary nodes communicate with any central server or other master node.

4. The system of claim 3, wherein each of the plurality of stationary nodes transmits the ranging signal using direct-sequence spread spectrum (DSSS).

5. The system of claim 4, wherein the DSSS uses maximal code decimation.

6. The system of claim 4, wherein the ranging signal transmitted by each of the plurality of stationary nodes is spread one gigahertz wide.

7. The system of claim 3, wherein all of the ranging signals transmitted by the plurality of stationary nodes use a same Linear Feedback Shift Register (LFSR) polynomial code, and wherein each of the plurality of stationary nodes uses a different pseudorandom number (PN) offset than all others of the plurality of stationary nodes, such that the ranging signal transmitted by each of the plurality of stationary nodes is distinguishable from the ranging signal transmitted by all others of the plurality of stationary nodes based on the respective PN offset.

8. The system of claim 7, wherein each of the plurality of stationary nodes is configured to:
   monitor the PN offsets of the others of the plurality of stationary nodes; and,
   when the PN offset of the stationary node is within a threshold distance to a monitored PN offset,
      determine whether or not the stationary node should perform a PN jump based on at least one predefined criterion, and,
      when determining that the stationary node should perform the PN jump, randomly select a new PN offset that does not conflict with any of the monitored PN offsets.

9. The system of claim 1, further comprising a roaming node, wherein the roaming node comprises at least one processor configured to:
   receive the ranging signals transmitted by at least three of the plurality of stationary nodes; and
   calculate a three-dimensional position of the roaming node within the indoor environment based on an unsynchronized time difference of arrival of the ranging signals and the offset included in each of the received ranging signals.

10. The system of claim 9, wherein the roaming node comprises one or more inertial measurement units, and wherein an output of the one or more inertial measurement units is used during calculation of the three-dimensional position of the roaming node.

11. The system of claim 9, wherein the roaming node never uses a reverse link from the roaming node to any of the plurality of stationary nodes to receive the ranging signals and calculate its three-dimensional position.

12. The system of claim 9, wherein the at least one processor of the roaming node is further configured to transmit the three-dimensional position to a remote server over at least one network.

13. The system of claim 12, further comprising the remote server, wherein the remote server is configured to:
from each of a plurality of roaming nodes, receive the three-dimensional position,
calculated by the roaming node, over the at least one network; and
provide at least one software-based service based on the received three-dimensional position of one or more of the plurality of roaming nodes.

14. The system of claim 1, wherein at least one of the plurality of stationary nodes is configured to transmit a packet comprising one or more parameters for the at least one stationary node and a neighboring set of the plurality of stationary nodes that are neighbors of the at least one stationary node, wherein the packet is either a Bluetooth™ packet or a Wi-Fi™ packet, wherein the system further comprises a roaming node, and wherein the roaming node comprises at least one processor configured to:
detect the packet transmitted by the at least one stationary node;
use the one or more parameters in the packet to acquire the ranging signals for the at least one stationary node and the neighboring set of stationary nodes; and
after acquiring the ranging signals for the at least one stationary node and the neighboring set of stationary nodes, calculate a three-dimensional position of the roaming node within the indoor environment based on an unsynchronized time difference of arrival of the acquired ranging signals and the offset included in each of the acquired ranging signals.

15. The system of claim 1, wherein at least one of the plurality of stationary nodes is configured to transmit a packet comprising an identifier of the stationary node, wherein the packet is either a Bluetooth™ packet or a Wi-Fi™ packet, wherein the system further comprises a roaming node, and wherein the roaming node comprises at least one processor configured to:
detect the packet transmitted by the at least one stationary node;
use the identifier in the packet to retrieve aiding information from a remote server over at least one network, wherein the aiding information comprises one or more parameters for the at least one stationary node and a neighboring set of the plurality of stationary nodes that are neighbors of the at least one stationary node;
use the aiding information to acquire the ranging signals for the at least one stationary node and the neighboring set of stationary nodes; and
after acquiring the ranging signals for the at least one stationary node and the neighboring set of stationary nodes, calculate a three-dimensional position of the roaming node within the indoor environment based on an unsynchronized time difference of arrival of the acquired ranging signals and the offset included in each of the acquired ranging signals.

16. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits,
wherein each of the plurality of stationary nodes is configured to operate in both a first mode in which only a forward link is used from the stationary node to each of one or more roaming nodes, and a second mode in which both the forward link is used and a reverse link is used from each of the one or more roaming nodes to the stationary node.

17. The system of claim 16, wherein each of the plurality of stationary nodes is configured to:
monitor for a signal on the reverse link with a pseudo-random number (PN) offset within a threshold distance from a PN offset used by the stationary node; and,
when the signal is detected on the reverse link, broadcast a time and carrier offset between the detected signal and a pilot signal of the stationary node.

18. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits, wherein a transmission power of each ranging signal is set such that the ranging signal is below thermal background noise at room temperature at a distance of one meter from the stationary node that transmitted the ranging signal.

19. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits; and
a calibration node, wherein the calibration node comprises at least one processor configured to, after the plurality of stationary nodes have been arranged in the constellation and while the calibration node is moved in a pattern with a known relationship to a datum of the indoor environment, calculate a location of each of the plurality of stationary nodes with respect to the datum.

20. A system enabling location determination within an indoor environment, the system comprising:
a plurality of stationary nodes to be arranged as a constellation within the indoor environment, wherein each of the plurality of stationary nodes is configured to
transmit a ranging signal, receive ranging signals transmitted by one or more neighboring ones of the plurality of stationary nodes, calculate an offset between the ranging signal that the stationary node transmits and the ranging signals received from the one or more neighboring stationary nodes, and include the offset in the ranging signal that the stationary node transmits, wherein each ranging signal comprises a pilot channel, a binary offset carrier (BOC) channel, a data channel, and an acquisition channel.

21. The system of claim 20, wherein the data channel uses block interleaving and forward error correction (FEC) code.

22. The system of claim 20, wherein the pilot channel, the BOC channel, and the data channel use a long code, and the acquisition channel uses a short code that is shorter than the long code.

23. The system of claim 22, further comprising a roaming node, wherein the roaming node comprises at least one processor configured to:

for at least one of the plurality of stationary nodes, acquire the ranging signal transmitted by the at least one stationary node by acquiring the acquisition channel in the ranging signal by searching for the short code of the stationary node, using the acquired acquisition channel to acquire a timing of the pilot channel in the ranging signal, and using the timing of the pilot channel to acquire a timing of the BOC channel and the data channel in the ranging signal; and, after the ranging signals have been acquired from three or more stationary nodes, comprising the at least one stationary node, calculate a three-dimensional position of the roaming node within the indoor environment based on an unsynchronized time difference of arrival of the acquired ranging signals and the offset included in each of the acquired ranging signals.

24. The system of claim 23, wherein the data channel in the ranging signal transmitted by the at least one stationary node comprises aiding information comprising one or more parameters for a neighboring set of the plurality of stationary nodes that are neighbors of the at least one stationary node, wherein the at least one processor of the roaming node is further configured to use the aiding information to acquire the ranging signals for the neighboring set of stationary nodes, and wherein the three or more stationary nodes comprise the neighboring set of stationary nodes.

25. The system of claim 22, further comprising a roaming node, wherein the roaming node comprises at least one processor configured to:

for at least one of the plurality of stationary nodes, acquire the acquisition channel in the ranging signal transmitted by the at least one stationary node by searching for the short code of the stationary node;

use the acquired acquisition channel to retrieve aiding information from a remote server over at least one network, wherein the aiding information comprises one or more parameters for the at least one stationary node and a neighboring set of the plurality of stationary nodes that are neighbors of the at least one stationary node;

use the aiding information to acquire the ranging signals for the at least one stationary node and the neighboring set of stationary nodes; and after acquiring the ranging signals for the at least one stationary node and the neighboring set of stationary nodes, calculate a three-dimensional position of the roaming node within the indoor environment based on an unsynchronized time difference of arrival of the acquired ranging signals and the offset included in each of the acquired ranging signals.

26. A system enabling location determination within an indoor environment, the system comprising:

a plurality of stationary nodes to be arranged as a constellation within the indoor environment, wherein each of the plurality of stationary nodes is configured to transmit a ranging signal, receive ranging signals transmitted by one or more neighboring ones of the plurality of stationary nodes, calculate an offset between the ranging signal that the stationary node transmits and the ranging signals received from the one or more neighboring stationary nodes, and include the offset in the ranging signal that the stationary node transmits, wherein the ranging signal transmitted by at least one of the plurality of stationary nodes uses a different polynomial code than the ranging signal transmitted by one or more others of the plurality of stationary nodes.

27. A system enabling location determination within an indoor environment, the system comprising:

a plurality of stationary nodes to be arranged as a constellation within the indoor environment, wherein each of the plurality of stationary nodes is configured to transmit a ranging signal, receive ranging signals transmitted by one or more neighboring ones of the plurality of stationary nodes, calculate an offset between the ranging signal that the stationary node transmits and the ranging signals received from the one or more neighboring stationary nodes, and include the offset in the ranging signal that the stationary node transmits, wherein the offset is included in the ranging signal as one or more coefficients to a predictive modeling equation.

28. A system enabling location determination within an indoor environment, the system comprising:

a plurality of stationary nodes to be arranged as a constellation within the indoor environment, wherein each of the plurality of stationary nodes is configured to transmit a ranging signal, receive ranging signals transmitted by one or more neighboring ones of the plurality of stationary nodes, calculate an offset between the ranging signal that the stationary node transmits and the ranging signals received from the one or more neighboring stationary nodes, and include the offset in the ranging signal that the stationary node transmits, wherein each ranging signal comprises a packet that comprises the offset, wherein each packet is either a Bluetooth™ or Wi-Fi™ packet, and wherein each of the plurality of stationary nodes is configured to transmit the packet at least ten times per second.

29. The system of claim 28, wherein each of the plurality of stationary nodes is configured to, for each of a plurality of time periods:

generate a random number;

broadcast the random number;

receive the random numbers broadcast by others of the plurality of stationary nodes; and transmit the packet according to an order of the generated random number within the received random numbers.

30. The system of claim 28, further comprising a roaming node, wherein the roaming node comprises at least one processor configured to:
receive the packets transmitted by at least five of the plurality of stationary nodes; and
calculate a three-dimensional position of the roaming node within the indoor environment based on an unsynchronized time difference of arrival of the packets and the offset included in each of the received packets.

31. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits,
wherein each of the plurality of stationary nodes is further configured to transmit both a primary ranging signal and a secondary ranging signal, and wherein the secondary ranging signal has a different center carrier frequency than the primary ranging signal.

32. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits; and
a server configured to:
from each of one or more roaming nodes within the indoor environment, receive an indication of a power level of one or more ranging signals, transmitted by a subset of the plurality of stationary nodes, as received by the roaming node; and
apply an optimization algorithm to the received indications of power levels to determine one or more adjustments to a transmission power of the ranging signal transmitted by one or more of the plurality of stationary nodes; and
send a control instruction to the one or more stationary nodes to adjust the transmission power of the one or more stationary nodes according to the determined one or more adjustments.

33. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits,
wherein each of the plurality of stationary nodes is configured to cycle transmission of the ranging signal between on and off.

34. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits, wherein the offset comprises a time offset and a frequency offset.

35. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits; and
wherein all of the ranging signals transmitted by the plurality of stationary nodes use a same Linear Feedback Shift Register (LFSR) polynomial code, and wherein each of the plurality of stationary nodes uses a different pseudorandom number (PN) offset than all others of the plurality of stationary nodes, such that the ranging signal transmitted by each of the plurality of stationary nodes is distinguishable from the ranging signal transmitted by all others of the plurality of stationary nodes based on the respective PN offset.

36. A system enabling location determination within an indoor environment, the system comprising:
a plurality of stationary nodes to be arranged as a constellation within the indoor environment, wherein each of the plurality of stationary nodes is configured to
transmit a ranging signal,
receive ranging signals transmitted by one or more neighboring ones of the plurality of stationary nodes,
calculate an offset between the ranging signal that the stationary node transmits and the ranging signals received from the one or more neighboring stationary nodes, and
include the offset in the ranging signal that the stationary node transmits; and
wherein each of the plurality of stationary nodes transmits the ranging signal using direct-sequence spread spectrum (DSSS).

* * * * *